(12) United States Patent
Abbott et al.

(10) Patent No.: US 8,278,040 B2
(45) Date of Patent: Oct. 2, 2012

(54) OPTICALLY RESPONSIVE AND MECHANICALLY TUNABLE COLLOID-IN-LIQUID CRYSTAL GELS

(75) Inventors: Nicholas L. Abbott, Madison, WI (US); Ankit Agarwal, Madison, WI (US); Santanu K. Pal, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 475 days.

(21) Appl. No.: 12/512,362

(22) Filed: Jul. 30, 2009

(65) Prior Publication Data

US 2010/0062525 A1   Mar. 11, 2010

Related U.S. Application Data

(60) Provisional application No. 61/084,741, filed on Jul. 30, 2008.

(51) Int. Cl.
*C12Q 1/68* (2006.01)

(52) U.S. Cl. ............... 435/6.1; 435/7.1; 435/29; 349/1; 349/88

(58) Field of Classification Search .................. None
See application file for complete search history.

(56) References Cited

U.S. PATENT DOCUMENTS 6,060,327 A * 5/2000 Keen .................................. 506/9
6,620,466 B2   9/2003 Nakamura et al.
7,842,499 B2 * 11/2010 Murphy et al. ............ 435/288.4

OTHER PUBLICATIONS

Petrov, P. G., "Formation of Cellular Solid in Liquid Crystal Colloids", Langmuir, 17, 2942-2949, 2001.
Cleaver, J., "Network formation in colloid-liquid crystal mixtures studied by confocal microscopy", J. Phys.: Condens. Matter 16, S1901-S1909, 2004.
Vollmer, D., "Formation of Self-Supporting Reversible Cellular Networks in Suspensions of Colloids and liquid Crystals", Langmuir, 21, 4921-4930, 2005.
Meeker, S.P., "Colloid-liquid-crystal composites: An unusual soft solid", Physical Review E, vol. 61, No. 6, Jun. 2000.
Anderson, V.J., "Cellular solid behaviour of liquid crystal colliods 1. Phase seperation and morphology", Eur. Phys. J. E 4, 4-20, 2001.
Vollmer D., "The origin of network formation in colloid-liquid crystal composites", J. Phys.: Condens. Matter 16, L227-L233, 2004.
Anderson, V.J., "Cellular solid behaviour of liquid crystal colloids 2. Mechanical properties", Eur. Phys. J. E 4, 21-28, 2001.
Nakamura, H., "Optical Properties of Colloid Liquid Crystal Composites", Mol. Cryst. and Liq. Cryst., vol. 368, 167-174, 2001.
Van Boxtel, M.C.W., "A dielectric study on the relaxation and switching behaviour of liquid crystals confined within a colloidal network", Liquid Crystals, vol. 30, No. 2, 235-249, 2003.
Cates, M.E., "Colloidal arrest by capillary forces", J. Phys.: Condens. Matter 17, S2771-S2778, 2005.

* cited by examiner

*Primary Examiner* — Jim Ketter
(74) *Attorney, Agent, or Firm* — Bell & Manning, LLC

(57) ABSTRACT

Colloidal liquid crystal gels (CLCGs), sensors incorporating the CLCGs, culture substrates made from the CLCGs, and patterned films and molded articles made from the CLCGs are provided. The CLCGs are composite liquid crystal materials comprising networks of particles having liquid crystal domains dispersed therein.

14 Claims, 26 Drawing Sheets

(Numbers in the Figures represent seconds.)

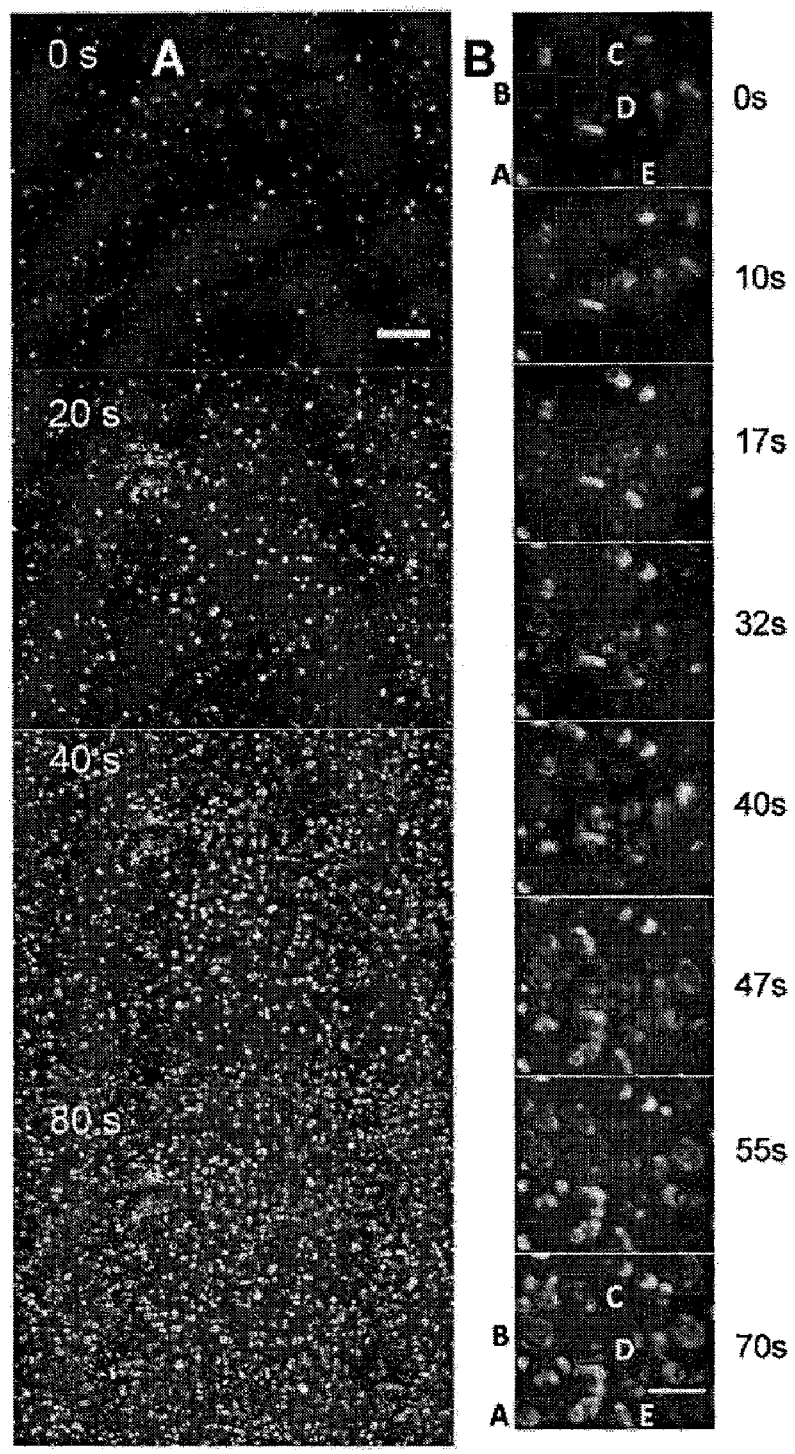
FIG. 14 (A,B)

OPTICALLY RESPONSIVE AND MECHANICALLY TUNABLE COLLOID-IN-LIQUID CRYSTAL GELS

CROSS REFERENCE TO RELATED APPLICATION

This application claims the benefit of pending U.S. provisional application Ser. No. 61/084,741 filed on Jul. 30, 2008, the entire disclosure of which is incorporated herein by reference.

GOVERNMENT SUPPORT

This invention was made with United States government support awarded by the following agencies: NSF Grants 0520527 0602570; and ARMY/ARO Grants W911NF-07-1-0446 and W911NF-06-1-0314. The United States government has certain rights in this invention.

BACKGROUND OF THE INVENTION

Liquid crystals (LCs) are anisotropic elastic materials that are comprised of molecules with translational mobility similar to that of isotropic fluids and long-range orientational ordering that is reminiscent of solid crystals[1]. Synthetic liquid crystals are a particularly promising but largely unexplored class of materials for engineering dynamic and responsive interfaces between synthetic and biological systems because interfacial events involving biomolecular and/or mechanical interactions can lead to reorganization of the LCs.[2-4] Such reorganization of the LCs can be transduced optically, as was demonstrated when human embryonic stem cells (hESCs) were cultured on the protein-coated surfaces of thermotropic LCs.[4] Whereas hESCs are known to grow on very soft materials (e.g. gels with shear modulus, G, <35 Pa),[5] many other types of mammalian cells require a level of mechanical rigidity in their underlying substrates that exceeds that of low molecular weight LCs in order to maintain normal cell functions.[5, 6]

Synthetic LCs have received attention as materials with which to create responsive interfaces to biological systems.[2-4, 12-15] Examples include the use of LCs to report the presence of viruses captured at surfaces,[12] amplify receptor-ligand binding events involving proteins,[2] and report enzymatic activity.[3, 13] Additionally, LCs have been studied as materials to create interfaces to mammalian cells.[4, 15] Fang et al. demonstrated that the thermotropic liquid crystal 4-cyano-4'-pentylbiphenyl, 5CB, assumed distinct orientations when it was layered over several different cell lines cultured on glass substrates.[14] However, those cells were fixed (i.e. dead) prior to contact with the LCs. In a later study by Luk et al.,[15] CB was shown to cause cell death within a short time period when placed into direct contact with live cells. To address the issue of cytotoxicity of LCs, Luk et al. screened a panel of LCs[15] and identified the nematic LC called TL205 that exhibited no cytotoxicity when fibroblasts were incubated under it for up to 4 hr. TL205 is a mixture of mesogens containing cyclohexane-fluorinated biphenyls and fluorinated terphenyls with aliphatic chains containing 2-5 carbon atoms (E Merck Co, Germany). Building from the study by Luk et al., Lockwood et al. demonstrated that ~20 μm thick films of TL205, when hosted within electron microscopy grids and coated with molecularly thin (thickness of ~10 nm) films of an extracellular matrix protein mixture (Matrigel), could support the growth and self-renewal of hESCs.[4] Reorganization of the Matrigel over time by the hESCs was found to trigger an orientational transition within the film of LC that could be readily seen by using polarized light transmitted through the LC.

Terentjev, Cates and others have demonstrated that suspensions of sterically stabilized polymethylmethacrylate (PMMA) particles (diam=200-1000 nm) dispersed in isotropic 5CB, i.e. above the nematic-isotropic phase transition temperature $T_{NI}$ ($T>T_{NI}$, with $T_{NI}$~35.5° C. for 5CB), when cooled to room temperature, form a network within the nematic 5CB, thereby creating a birefringent waxy composite with storage moduli of G'~1-10 kPa (30° C. with 5-15 wt % of colloids).[9-11]

SUMMARY OF THE INVENTION

Colloidal liquid crystal gels (CLCGs), methods for making the CLCGs, chemical and biological sensors incorporating the CLCGs, culture substrates made from the CLCGs, and patterned films and molded articles based on the CLCGs are provided.

The CLCGs comprise a network of particles and a plurality of domains comprising liquid crystals dispersed in the network. The CLCGs may be formed by creating a mixture comprising particles and mesogens in an isotropic state and allowing the mesogens to undergo an isotropic-nematic phase transition, such that the colloidal liquid crystal gel is formed.

Sensors into which the CLCGs can be incorporated comprise a first substrate; a layer of the colloidal liquid crystal gel disposed on the surface of the substrate and, optionally, one or more recognition moieties associated with one or more liquid crystal domains. In the sensors, the layer of colloidal liquid crystal gel has a first surface and a second surface disposed opposite the first surface. In some embodiments, the liquid crystal domains extend through the layer from the first surface to the second surface. In some embodiments, the surface of the first substrate is a mesogen-aligning surface. The mesogen-aligning surface can be, for example, chemically patterned (e.g., by creating a pattern of different chemical functionalities on the surface), such that it imparts a pattern to the liquid crystal domains in the CLCGs.

Methods for sensing an analyte using the sensors comprise exposing a sample containing, or suspected of containing, the analyte to the sensor and monitoring an analyte-induced change in one or more of the liquid crystal domains.

Cell culture substrates incorporating the CLCGs comprise a film comprising a protein or a peptide disposed over the colloidal liquid crystal gel. Methods of culturing cells on the cell culture substrate comprise seeding living cells onto the film and culturing the seeded living cells. Similarly, methods for detecting cell-induced changes to the cell culture substrates comprise seeding living cells onto the film, culturing the seeded living cells and monitoring a cell-induced change in one or more of the liquid crystal domains.

A molded colloidal liquid crystal gel comprises a CLCG having a first surface, and a pattern of molded features defined in the first surface of the colloidal liquid crystal gel. Such patterned CLCGs may be used, for example, as micro-well plates and microfluidic devices. In one simple embodiment, a CLCG is molded between two parallel substrates to form a thin, substantially flat CLCG layer that can be used as a sensor, as described above.

Chemical structure of L-DLPC; and (f) decrease in the mean light intensity of the CLCG film with time on incubation in aqueous solution of L-DLPC.

Figure 17:
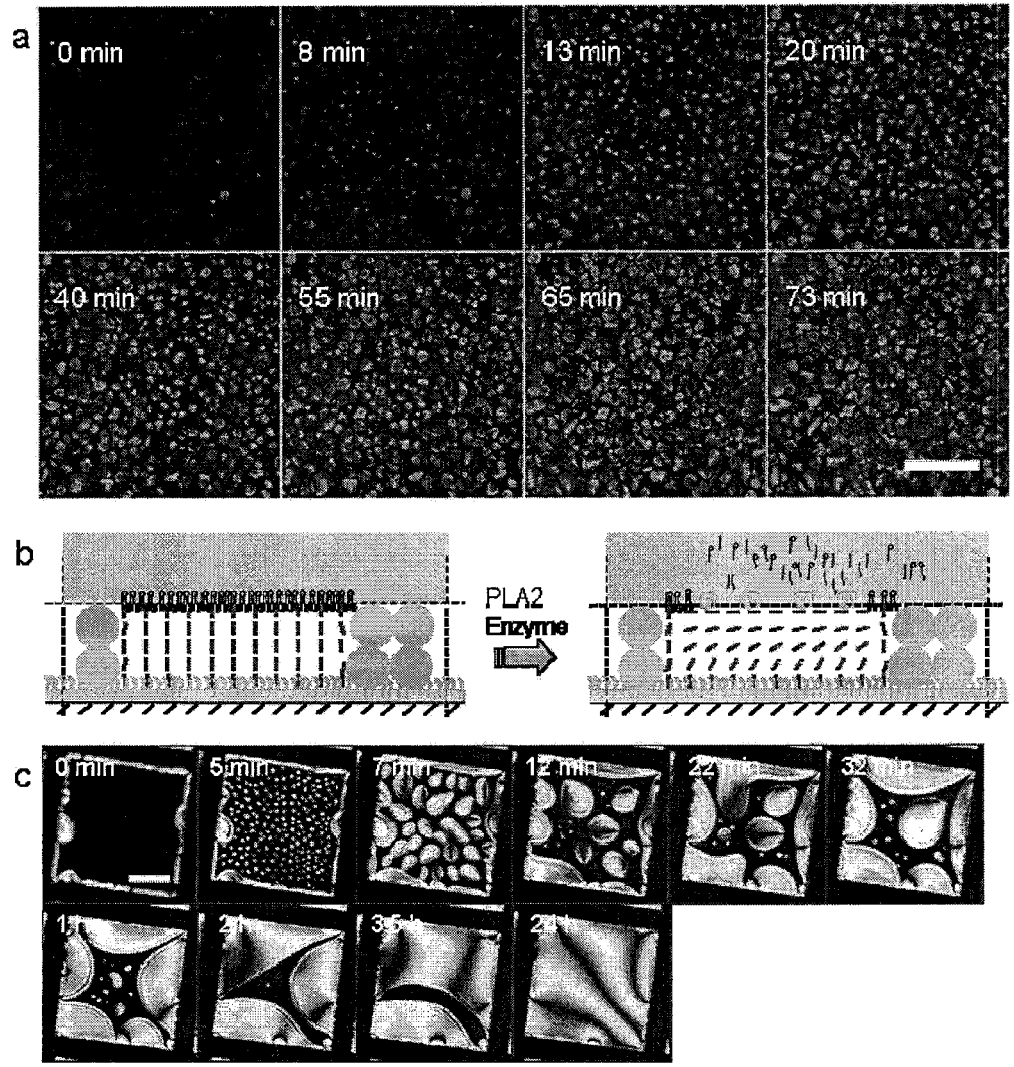
Figure 17D:
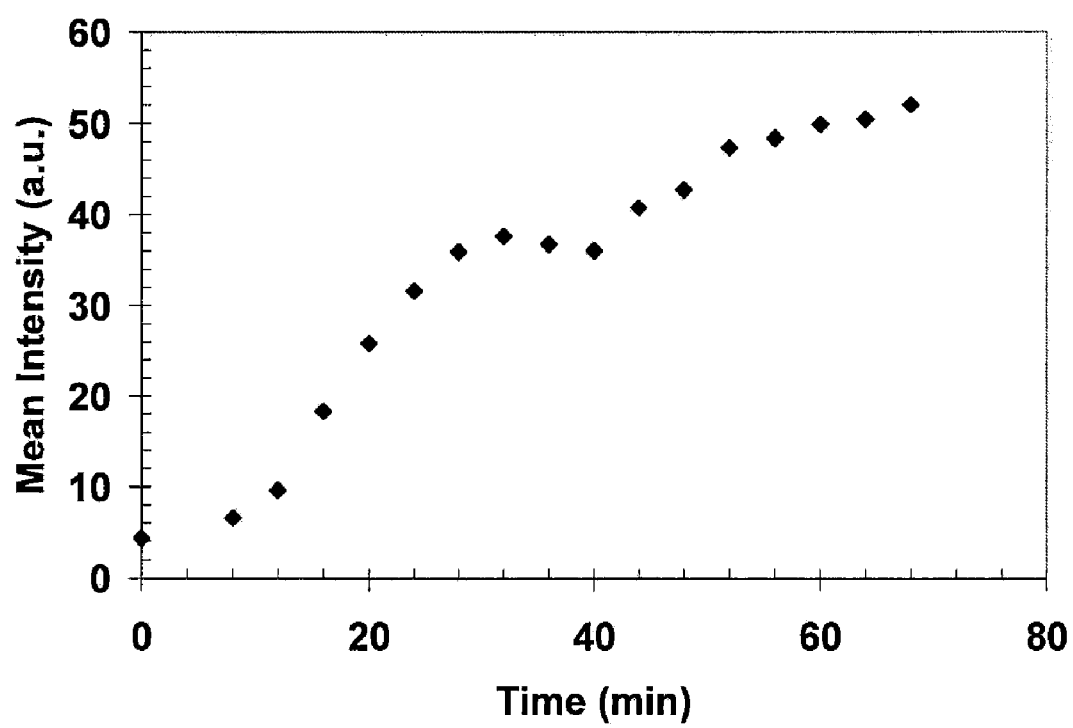

FIG. 17 shows the change in the birefringence of the L-DLPC laden LC/aqueous interface of the LC domains of CLCG films in response to the enzymatic degradation of L-DLPC by 10 nM PLA2 enzyme (in buffer containing 6.2 mM $Ca^{++}$): (a) Optical micrographs (between crossed-polars) of a CLCG film, with L-DLPC absorbed on aqueous/LC surface, at successive time points after incubating PLA2; scale bar—50 µm; (b) Sketch of the orientational order of LC in LC-rich domains of CLCGs before and after lipid degradation on aqueous/LC interface. (c) Optical micrographs of E7 housed in a specimen-grid, with L-DLPC absorbed on aqueous/LC surface, at successive time points after incubating with PLA2; scale bar—100 µm; (d) increase in the mean light intensity with time of the CLCG film.

Figure 18:
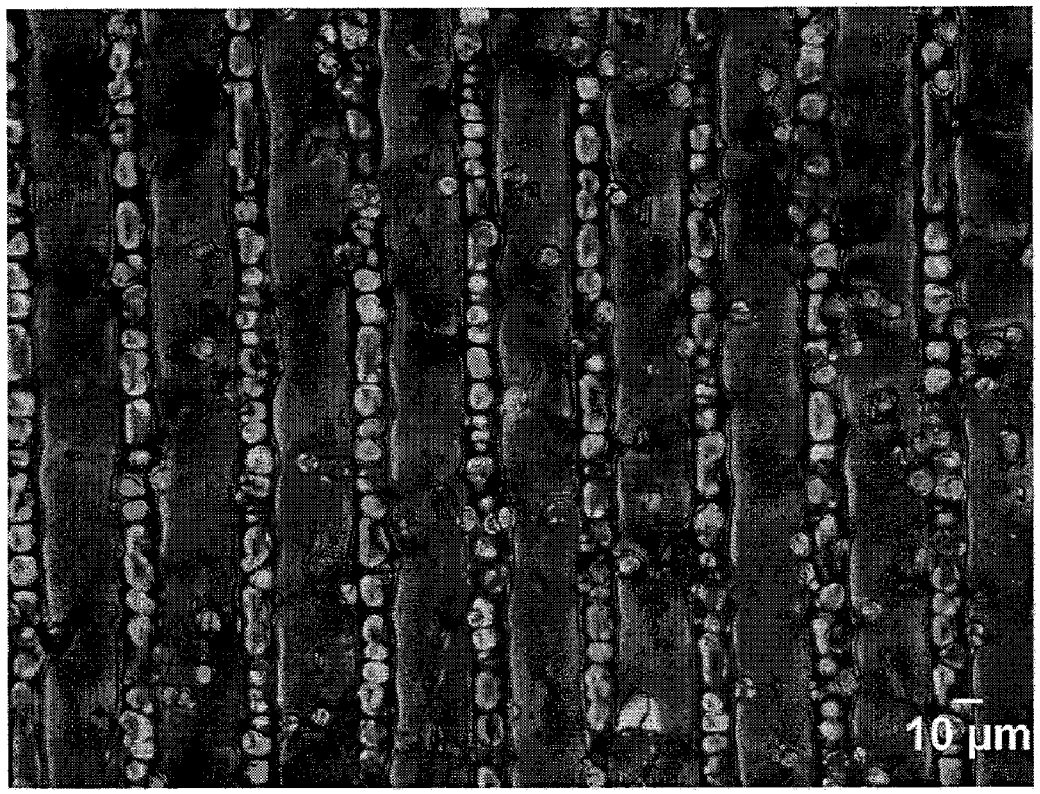

FIG. 18 shows a polarized light micrograph of the patterned CLCG of Example 10.

DETAILED DESCRIPTION OF THE PREFERRED EMBODIMENTS

Colloidal liquid crystal gels (CLCGs), sensors incorporating the CLCGs, culture substrates made from the CLCGs, and patterned films and molded articles based on the CLCGs are provided. The CLCGs are composite liquid crystal materials comprising networks of colloidal particles having liquid crystal domains dispersed therein.

Figure 1:
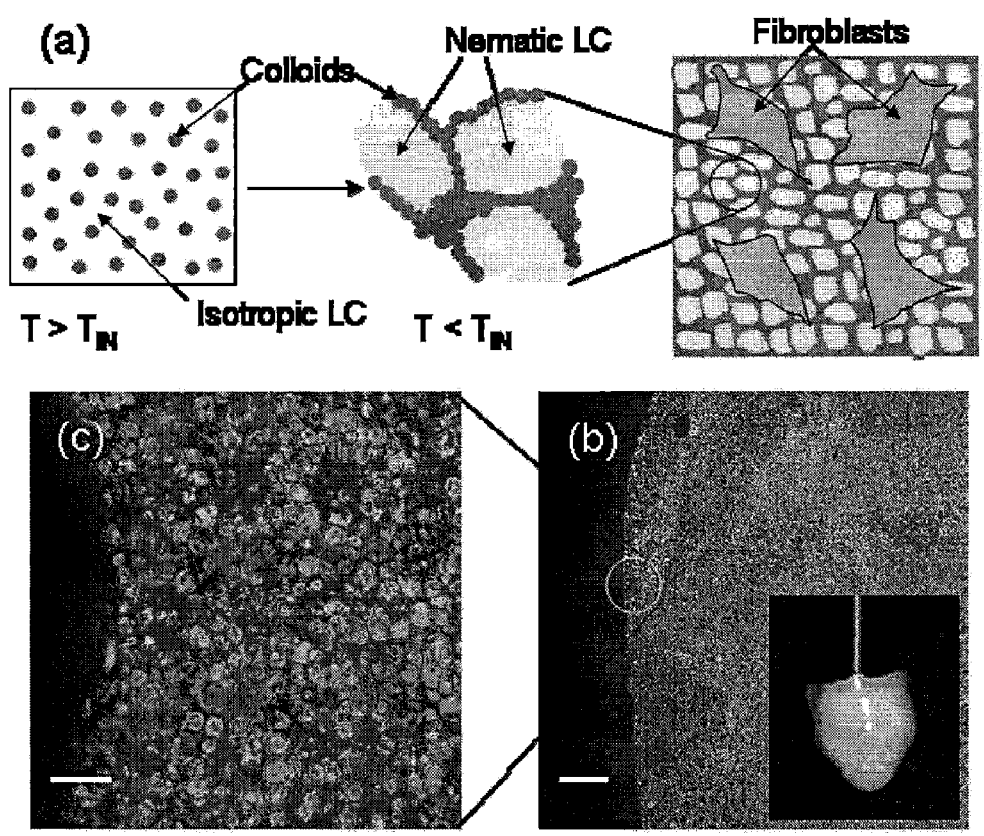
FIG. 1(a) is a schematic illustration of the formation of colloidal networks upon cooling of mesogens below $T_{NI}$. The cartoon at top right depicts fibroblasts growing on a CLCG containing LC domains. (b) Polarized light micrograph of 10 µm-thick film of CLCG composed of 15 wt % polystyrene (PS) particles dispersed in E7 (scale bar=200 µm). (c) High magnification image of (b) (scale bar=20 µm). Inset in b: CLCG molded in the shape of a tube in which it was formed, held in air with a needle inside it.

CLCGs:

In their basic form, the CLCGs include a network of particles and a plurality of liquid crystal domains dispersed in the network. The CLCGs may be made by creating a mixture comprising particles and mesogens in an isotropic state and allowing the mesogens to undergo an isotropic-nematic phase transition to form the CLCGs. The isotropic mesogen phase can be produced by heating the mesogens to a temperature above their nematic-isotropic phase transition temperature. Alternatively, the isotropic mesogen phase can be produced by dissolving the mesogens in an appropriate solvent. The factors that lead to formation of the CLCGs can result from expulsion of the colloidal particles from the mesogens as they pass from the isotropic to the nematic phase (FIG. 1a).

As used herein, the term "mesogen" refers to compound(s) that form liquid crystals, and in particular rigid rod-like or disc-like molecules that are components of liquid crystalline materials. The use of the term mesogen, however, does not imply a limitation on the shapes of the molecules that can be used to form liquid crystals in this invention.

As used herein, the term "liquid crystal" refers to a thermodynamic ally stable phase characterized by anisotropy of properties without the existence of a three-dimensional crystal lattice, generally lying in the temperature range between the solid and isotropic liquid phase.

The liquid crystals in the CLCGs are desirably thermotropic liquid crystals. As used herein, "thermotropic liquid crystal" refers to a liquid crystal that can be formed from the melting of mesogenic solids. The thermotropic liquid crystals can exist in a number of forms including nematic, chiral nematic, smectic, polar smectic, chiral smectic, ferroelectric, antiferroelectric, frustrated phases and discotic phases. By way of illustration only, an example of a thermotropic liquid crystal for use in the CLCGs is 5CB. In certain applications it may be advantageous if the liquid crystals are nontoxic, or substantially nontoxic, to living cells. Such liquid crystals include liquid crystals with chemical functional groups such as fluorine atoms, fluorophenyl groups, or difluorophenyl groups. Examples of non-toxic liquid crystals include C series liquid crystals, TL205 and E7, both of which are described in greater detail in the Examples section, below. Substantially non-toxic liquid crystals can be identified by measurements of cytotoxicity, using the methods and criteria reported by Luk and coworkers in Luk, Y. Y.; Campbell, S. F.; Abbott, N. L.; Murphy, C. J. "Non-Toxic Thermotropic Liquid Crystals for Use with Mammalian Cells", Liquid Crystals, 31, 611 (2004).

The particles making up the network in the CLCGs may take on a variety of forms. They may be organic (e.g., particles synthesized from synthetic or natural polymers) particles or inorganic particles (e.g., particles made from glasses), or they may be a mixture of organic and inorganic particles. Specific examples of suitable organic polymer particles include polystyrene particles (e.g., polystyrene microspheres), charge-stabilized (e.g., sulfate-stabilized) polystyrene particles, and polymethylmethacrylate (PMMA) microparticles. Polystyrene microparticles can be charge stabilized with, for example, sulfate ($SO_4^{2-}$) functional groups, carboxyl ($CO_2^{-2}$ functional groups), carboxylsulfate functional groups, crossed-linked carboxyl and sulfate functional groups, or surfactant sulfate functional groups, and can have charged stabilized, particle diameter ~20 nm-10 µm. Still other particles include, clay particles, cellulose particles, metal particles, and particles derived from biological molecules, including plant and animal derived molecules. The colloidal silica microparticles can be charge stabilized, hydrophilic silica particles (organosilica spheres), silica spheres coated with APS [(3-iminopropyl) triethoxysilane or organosilica spheres chemically linked with dye or fluorophore (fluorescein isothiocyanate) with the APS.

For at least some applications, these particles are desirably free from any solvent-based impurities. As used herein, the term solvent-based impurities refers to solvent molecules from a solvent in which the microparticles are stored prior to use in the CLCG, which penetrate the particles and are not removed prior to the incorporation of the microparticles into a CLCG. In this respect the present gels can be distinguished from previous colloidal liquid crystal composites in which microparticles have been penetrated with solvents (e.g., alkane solvents, such as hexane) which subsequently participate in the particle network formation.

In some embodiments, the particles of the particle network are also free from steric stabilizing agents, such as surface ligands or surfactants. In other embodiments, steric stabilizing agents are employed. For example, silica particles can optionally be sterically stabilized with, for example 1-octadecanol. PMMA particles can be sterically stabilized with, for example, poly(12-hydroxystearic acid). Clay particles can be functionalized with a layer of poly (isobutylene) based stabilizer SAP 230 TP.

The particles can have a variety of sizes and concentrations within the CLCGs and can have a polydisperse or substantially monodisperse size distribution. In fact, as illustrated in Example 3, below, the sizes and/or concentration of particles in the CLCGs can be tailored to provide gels having a range of liquid crystal domain sizes. For example, in some embodiments the particles can have an average maximum diameter of no greater than about 5 µm. This includes embodiments wherein the particles have an average maximum diameter of no greater than about 2 µm, no greater than about 1 µm, no greater than about 500 nm, and no greater than about 200 nm.

Depending upon the nature, size and concentration of the particles in the CLCGs, the liquid crystal domains can have a wide range of sizes. By way of illustration only, the liquid crystal domains can be tailored to have average cross-sectional diameters of up to about 500 μm (e.g., about 1 to about 50 μm).

In some embodiments, the CLCGs have sufficient mechanical strength to render them moldable and suitable for such applications as cell culture substrates, microchannel devices and microwell plates. One measure of the mechanical strength of the CLCGs is their storage modulus (G'). In some embodiments the GLCGs have G' values of at least about 1 kPa at 37° C. This includes embodiments wherein the GLCGs have a G' value of at least about 5 kPa at 37° C. For example, the CLCGs may have G' values from about 1 kPa to about 100 kPa at 37° C.

CLCG-Based Sensors:

The CLCGs may take the form of a thin layer and, as such, may be incorporated into chemical- and/or bio-sensors. The CLCGs can be disposed over a substrate or can be free-standing structures, unsupported by an underlying substrate. Such sensors include a layer of CLCG on a substrate. In some embodiments, the substrate may have a mesogen-aligning surface. In one embodiment, the sensors further include one or more recognition moieties associated with one or more of the liquid crystal domains or one or more of the particles in the network of particles. For example, the recognition moieties can be adsorbed onto the liquid crystal domains, present within the liquid crystal domains, immobilized by the mesogens, immobilized on particles in the particle network, or immobilized by the substrate or mesogen-aligning substrate underlying the liquid crystal domains.

As used herein, the term "mesogen-aligning surface" can be any surface that, by nature of its chemical make-up, topography, chemical functionalization, or other property, causes mesogens to align in a desired, substantially ordered direction in a liquid crystal when in contact with the surface. Such surfaces may comprises metals (e.g., gold), polymers, self-assembled monolayers, or organic or inorganic materials. In some embodiments, the mesogen-aligning surface comprises a polyimide. In one embodiment, the mesogen-aligning surface is functionalized with metal salts. An example of this embodiment is provided in Example 6, below.

In one embodiment of the sensors, the CLCG layer has a first surface and a second surface opposite the first surface and is sufficiently thin to allow the liquid crystal domains to extend through the CLCG layer from the first CLCG surface to the second CLCG surface. Thus, the optimal thickness of the CLCG layers will depend on the mesogens that make up the liquid crystal domains. In some embodiments, the CLCG layer will have a thickness of no greater than 200 μm.

The sensors may optionally include a second substrate arranged opposite the first substrate to form a cell by pairing the first substrate with the second substrate to form a chamber in which the CLCG is contained. In other embodiments, an open-well detection format is utilized in which a well containing the CLCG is left at least partially open to the atmosphere.

A variety of recognition moieties may be associated with the liquid crystal domains of the CLCGs. As used herein, the term "recognition moiety" refers to a composition of matter that interacts with an analyte of interest in either a covalent or noncovalent manner. In some embodiments, each of the liquid crystal domains in the CLCG have the same recognition moiety associated therewith. In other embodiments, the different domains within the plurality of liquid crystal domains have different recognition moieties associated therewith. In some embodiments, the recognition moiety is an organic molecule or a biomolecule and can be a biomolecule selected from the group consisting of a protein, polypeptide, peptide, nucleic acid, carbohydrate, lipid, and a phospholipid. In other embodiments the recognition moiety can be an inorganic material, such as a gold particle. The recognition moiety can comprise one or more organic functional groups capable of interacting with an analyte of interest, such groups include amines, carboxylic acids, drugs, chelating agents, crown ethers, cyclodextrins or a combination thereof. The recognition moiety can also be mesogenic and comprise part of the liquid crystal domains.

It is possible for a single moiety to act as an analyte and a recognition moiety in different applications of the sensors. For example, in one embodiment, lipids (e.g., a glycolipid such as lipopolysaccharide) can act as an analyte, creating a detectable analyte induced change in the appearance of the liquid crystal domains. While in another embodiment, the lipid can act as a recognition moiety associated with the CLCG which interacts with an analyte, such as a lipid degrading enzyme, to provide an analyte induced change in the appearance of the liquid crystal domains. This is illustrated in Examples 8 and 9, below.

The mesogen-aligning surface may be chemically functionalized in order to immobilize the recognition moieties thereon. For example, the mesogen-aligning surface underlying the liquid crystal domains of the CLCG can be functionalized with a self-assembled monolayer (SAM) on which the recognition moieties are immobilized. A recognition moiety can be attached to the surface of a SAM by any of a large number of art-known attachment methods. In one preferred embodiment, a reactive SAM component is attached to the substrate and the recognition moiety is subsequently bound to the SAM component via the reactive group on the component and a group of complementary reactivity on the recognition moiety (See, e.g., Hegner et al. Biophys. J. 70:2052-2066 (1996)).

Alternatively, the recognition moieties can be adsorbed or deposited onto the surface of the liquid crystal domains. For example, adsorption of recognition moieties onto the CLCGs can be accomplished by contacting the CLCG with an aqueous solution comprising recognition moieties and, optionally, a surfactant, whereby the recognition moieties are adsorbed onto the top surfaces of the liquid crystal domains. Langmuir-Shaefer methods can be used to deposit recognition moieties onto the surface of the liquid crystal domains. The recognition moieties can also be patterned or arranged onto the CLCGs using printing (e.g., inkjet) and spotting techniques.

Methods for using the CLCG-based sensors to sense one or more analytes in a sample containing, or suspected of containing, the analyte include the steps of contacting the sample with the CLCG and monitoring an analyte-induced change in one or more of the liquid crystal domains. The sample is typically, but not necessarily, in the form of an aqueous solution and may be a stationary sample or a flowing sample that is passed over the CLCG. In other embodiments, the sample can take the form of a gas.

Any analyte capable of inducing a detectable change in a liquid crystal domain upon interaction with the liquid crystal or a recognition moiety may be detected. Examples of suitable analytes include, but are not limited to, lipids, lipid-modified molecules (lapidated molecule), viruses, eukaryotic and prokaryotic cells, multicellular organisms, bacteria, lipid-membrane containing organisms, proteins, nucleic acids, carbohydrates, organic vapors, organophosphates and other biomolecules and organic molecules, as well as inorganic molecules. Thus, the present sensors can be adapted to detect a variety of analyte-recognition moiety combinations, including protein-protein, protein-nucleic acid, nucleic acid-nucleic acid, and other molecular interactions. Examples of samples in which the analytes may be contained include, but are not limited to, biological fluids and environmental fluids. The term "fluid" is used here to include all mobile states of matter, including liquids, liquid crystals, and gases.

A variety of analyte-induced changes in the liquid crystal domains can be monitored using the present sensors. These include, but are not limited to, a change in color, a change in optical texture, a change in phase state, a change in tilt, and a change from homeotropic orientation. Changes in optical properties of the liquid crystal domains can be quantified by using optical instrumentation such as, but not limited to, polarized light microscopes, crossed polars in transmission mode, plate readers, cameras, scanners, interferometric devices, and photomultiplier tubes. Visual inspection can also reveal a change in the liquid crystal induced by an analyte. In addition, because the dielectric properties of liquid crystals can also change with orientational order, measurements of electrical properties of liquid crystals can also be used to monitor interactions between analytes and liquid crystals. Other changes that can be measured include changes in capacitance, conductance, axis and anchoring energy.

Cell Culture Substrates and Monitoring Devices:

Due to their mechanical strength, the present CLCGs can also be used as cell culture substrates. The cell culture substrates include a CLCG and a film comprising a protein or peptide disposed over the CLCG. Methods for culturing cells on the substrates include the steps of seeding living cells onto the film and culturing the seeded living cells. An example of a method of culturing fibroblast cells using a CLCG-based culture substrate is provided in Example 1, below. The protein or peptide layer in the cell culture substrate preferably includes at least one protein or peptide that is or may function as an extracellular matrix component such as, but not limited to, gelatin, laminin or collagen. Such layers can be deposited at the surface of the liquid crystals using a variety of methods, including physical adsorption from solution, gelation and adsorption from solution, incorporation into multilayer structures formed at the interface of the liquid crystal domains and an aqueous solution (e.g., polyelectrolyte multilayer (PEM) films), incorporation into amphiphilic molecules such as peptide amphiphiles, and covalent attachment to the liquid crystal domains.

In addition to being used to culture cells, the CLCGs can be incorporated into devices that measure and detect cell-induced changes in a cell culture substrate (e.g., a protein layer) by living cells cultured on the substrate or CLCG-induced changed in the cells being cultured. Thus, in another aspect, methods for detecting cell-induced changes to a cell culture substrate by living cells are provided. Such methods include the steps of seeding living cells onto the protein or peptide film, culturing the seeded living cells and detecting reorganization of the liquid crystals in one or more of the liquid crystal domains. The reorganization indicates cell-induced changes between the living cells and the cell culture substrate.

Molded Articles:

The mechanical strength of the CLCGs also allows surfaces of the CLCGs to be molded and articles to be molded from the CLCGs. Thus, another aspect of the present CLCGs provides a layer of CLCG having a first surface and a pattern of features defined in (e.g., molded into) the first surface. The pattern can be defined in the surface by any suitable method, such as stamping, imprinting, molding, etc, and can have a range of dimensions, depending on the intended use. The pattern can be a non-random pattern. For example, the pattern can have one or more repetitive features. For example, the features may have at least one dimension that is no greater than 1 μm. This includes embodiments wherein the features have at least one dimension that is no greater than about 100 nm. However, features having one or more dimensions outside of these ranges may also be provided. For example, the features can have a length, width, and/or depth of 10 nm to 10 cm. As a result, layers of the CLCGs can be fabricated into useful substrates. For example, a multi-well plate can be fabricated by patterning a plurality of (e.g., an array of) wells in the surface of a CLCG layer. Similarly, a microfluidic device can be fabricated by patterning a plurality of fluid flow channels into the surface of a CLCG layer. Although such patterned CLCG layers may be supported on an underlying support substrate, no such support substrate is required. This can be an advantageous property since substrates (e.g., microwells) used to host or stabilize liquid crystals can be difficult to fill and prone to liquid crystal dewetting.

EXAMPLES

Example 1

Formation and Characterization of a CLCG for Use in Fibroblast Cell Culture

This example demonstrates the preparation of CLCGs containing low molecular weight LCs that can be tuned mechanically and that enable the culture of fibroblasts. The CLCGs can be molded at physiological temperatures into birefringent optical films with mechanical properties that promote the anchoring and proliferation of fibroblasts. The CLCGs contain micrometer-sized domains of LCs that respond to changes in orientational anchoring of the LCs at the confining boundaries. These results define materials and methods that offer the basis of new approaches for amplification of biomolecular and biomechanical interactions, such as the interactions of cells with substratum, into optical signals.

Materials and Methods:

Materials: Nematic liquid crystals TL205, 5CB and E7 were purchased from EMD Chemicals (Hawthorne, N.Y.). Gold TEM grids (bars 20 μm thick, 55 μm wide, and spaced 283 μm apart) were obtained from Electron Microscopy Sciences (Fort Washington, Pa.). Octadecyltrichlorosilane (OTS) and Fisher's Finest Premium Grade glass microscope slides were obtained from Fisher Scientific (Pittsburgh, Pa.). 8-well chamber slides were obtained from Nalgen Nunc International (Rochester, N.Y.). DMEM, calf bovine serum, and tissue culture plates were obtained from Invitrogen (Carlbad, Calif.).

Optical cells: Methods used to prepare and examine the liquid crystal hosted within optical cells have been described in detail elsewhere.[27] Briefly, glass microscope slides were cleaned according to published procedures based on 'piranha' [70:30 (% v/v) $H_2SO_4:H_2O_2$] and RCA cleaning,[28] and coated with OTS as described earlier.[27] A small square of OTS-coated glass (ca. 5 mm×5 mm) was fixed to the bottom of each well of an 8-well chamber slide with epoxy and cured overnight at 60° C. The wells were rinsed with ethanol to remove uncured monomer. Gold specimen grids, cleaned sequentially in methylene chloride, ethanol and methanol, were placed onto the OTS-coated glass surface in each well. Approximately 1 μl of TL205 was dispensed onto each grid and the excess of it was removed with a syringe to produce an approximately planar interface.

Colloid-liquid-crystal gels: Sulfate-coated polystyrene (PS) microspheres (#S37498, Invitrogen, Carlsbad, Calif.), 1 μm in diameter, were washed three times with DI water in Eppendorf tubes by centrifuging for 5 min at 9000 g, and resuspended in fresh DI water by sonication and vortexing.

The beads were finally washed and suspended in 200 µl ethanol, and dried in air for at least one week. To prepare colloid-liquid-crystal composites, dried PS beads were weighed and suspended in isotropic 5CB, TL205 or E7 contained in an Eppendorf tube. The suspension was heated above the $T_{NI}$ in an oven or water-bath and vortexed and sonicated vigorously, with extensive shaking and tumbling, for several hours to ensure homogenous dispersion of colloids. The suspension was then cooled at a fixed rate (~0.5° C./min) to room temperature in an oven to form a solid metastable composite. Yellow-green fluorescent (505/515) Fluo-Spheres® sulfate PS microspheres, 1 µm diameter (Molecular Probes #F8852) were used to prepare composites for confocal microscopy.

CLCG films: Thin films (2-100 µm) of CLCG were prepared as follows for confocal microscopy and cell culture. A small piece of CLCG was placed on a microscope glass slide and heated above $T_{NI}$. As the composite formed a transparent suspension, it was covered with a pre-warmed glass cover slip using spacers of desired thickness. The assembly was clamped with binder clips and cooled down at a fixed rate (0.5° C./min) to room temperature to form a thin sheet of CLCG. To obtain thin CLCG films supported on glass cover slips for cell proliferation assays, the glass slides coated with film of a fluorocarbon polymer NyeBar-Type Q (Nye Lubricants Inc, New Bedford, Mass.) were used.

Rheology: An Advanced Rheometric Expansion System (ARES) (TA Instruments, Rheometric Scientific, Piscataway, N.J.) with parallel-plate type geometry (test fixture; plate diameter 25 mm) was used to monitor the mechanical properties of the colloid-in-liquid-crystal composites (gels). Dynamic time, temperature, and frequency sweep tests were conducted in a shear strain-controlled mode. CLCGs were transferred to the rheometer plate at a temperature above the $T_{NI}$. A gap of 0.5-0.7 mm between the parallel plates was used such that CLCG fully filled the space between the plates, with excess material typically extended beyond the plates.

Confocal microscopy: Imaging was performed with a Nikon Diaphot 200 microscope equipped for standard widefield fluorescent, brightfield and differential interference contrast (DIC) microscopy. Confocal images were collected using LaserSharp 5.2 software. Image analysis was accomplished by ImageJ software. A krypton/argon mixed-gas laser with excitation line 488 nm was used to excite fluorescent PS microspheres, detected using a band pass filter of 505-539 nm. A z-series of typically 25 images with a spatial resolution of 0.5 to 1 µm was collected.

Cell culture: Mouse fibroblasts cell line NIH-3T3, obtained from ATCC (Manassas, Va.) was used for all cell proliferation experiments. Cell cultures were maintained in a humidified environment with 5% $CO_2$ at 37° C. and were fed with DMEM growth medium supplemented with 10% calf bovine serum (CBS) and 1 µM L-glutamine. For cell culture on CLCGs prepared on glass cover slips, the cover slips were placed in 6-well tissue culture plates and incubated with complete growth media overnight after washing with PBS and sterilizing with UV light for 10 min. Subsequently, the gels were washed and incubated with 0.1 wt % sterile gelatin solution overnight to coat a thin gelatin layer. Finally, the composites were washed with PBS three times and seeded with $2\times10^5$ cells/well of the six-well plate. For cell culture on LC optical cells prepared in 8-well chamber slides, $2\times10^4$ cells/well were seeded after coating them with gelatin overnight as mentioned earlier. After 24 hr incubation in growth medium, cells were washed and labeled with live/dead assay stains and Hoescht nuclei stain (Molecular Probes #L3224 and #33258, respectively) following manufacturer's protocol. Briefly, cells were incubated for 20 min with 2 µM calcein AM (ex/em ~495 nm/515 nm), 2 µM Ethidium homodimer-1 (EthD-1, ex/em ~495 nm/~635 nm) and 2 µg/ml Hoescht stain (ex/em ~360 nm/~460 nm) in PBS buffer. While cells in 8-well chamber slides were observed by directly placing the plates over the inverted microscope, the cover-slips containing CLCGs were taken out of 6-well plates and mounted on glass slides with a drop of PBS placed in between to prevent the cells from drying out. An Olympus IX-71 inverted microscope equipped with Chroma Technology Corp. (Rockingham, Vt.) fluorescence filter cubes was used. Images were taken with a Hamamatsu digital camera controlled by ImagePro software.

Ellipsometry Silicon wafers were piranha cleaned and RCA cleaned as described above,[28] generating a hydrophilic surface and were coated with OTS to create hydrophobic surface according to previously published procedures.[27] Gelatin films were deposited on these hydrophobic or hydrophilic surfaces following methods similar to those described above for CLCGs. Ellipsometry measurements were made with a Gaertner LSE ellipsometer, $\lambda=632.8$ nm, $\psi=70°$. The effective substrate parameters were measured by averaging six measurements on six different silicon-wafer pieces. The refractive index of gelatin was used as 1.52.

Results:

5CB CLCGs at near-room temperature, are not well-suited for cell culture because (i) the $T_{NI}$ of 5CB (~35.5° C.) is below the optimal temperature for mammalian cell culture (37° C.) and (ii) 5CB is cytotoxic. Therefore TL205 ($T_{NI}$~87.5° C.) and E7 ($T_{NI}$~59.9° C.) were used to form CLCGs. The possibility of forming CLCGs using commercially available negatively charged (sulfate-functionalized) polystyrene (PS) microspheres (diam=1 µm) was investigated.

To explore formation of the CLCGs, dried PS microspheres were suspended in isotropic E7 or TL205 that was heated above the $T_{NI}$ of each material in an eppendorf tube placed in an oven or water-bath. The suspension was vortexed and sonicated vigorously with extensive shaking and tumbling for several hours to ensure homogenous dispersion of the colloids based on visual inspection. The majority of the studies were performed using E7 (because it has a lower $T_{NI}$ than TL205), although the results below were reproduced with TL205. Care was taken to work below the glass transition temperature ($T_g$) of PS, which is around 100° C.[19] Each suspension of microspheres was then cooled in an oven at a fixed rate (~0.5° C./min) to room temperature. As E7 transformed from the isotropic to nematic state, the CLCG suspensions formed a birefringent metastable composite, shown in an inset in FIG. 1b, which was soft enough to be pierced by a needle and yet able to sustain its shape and weight. FIGS. 1b and c show representative results obtained with E7 containing 15 wt % PS particles. Polarized light micrographs of 10-12 µm thick films of the CLCG are shown in FIGS. 1b and c, revealing bright nematic domains of E7 (diams of ~10 µm) separated by dark boundaries that contained high concentrations of the microspheres (details below). CLCGs, although metastable materials, remained intact for long time periods due to the energetic barriers associated with domain wall disruption.[20]

Figure 2:
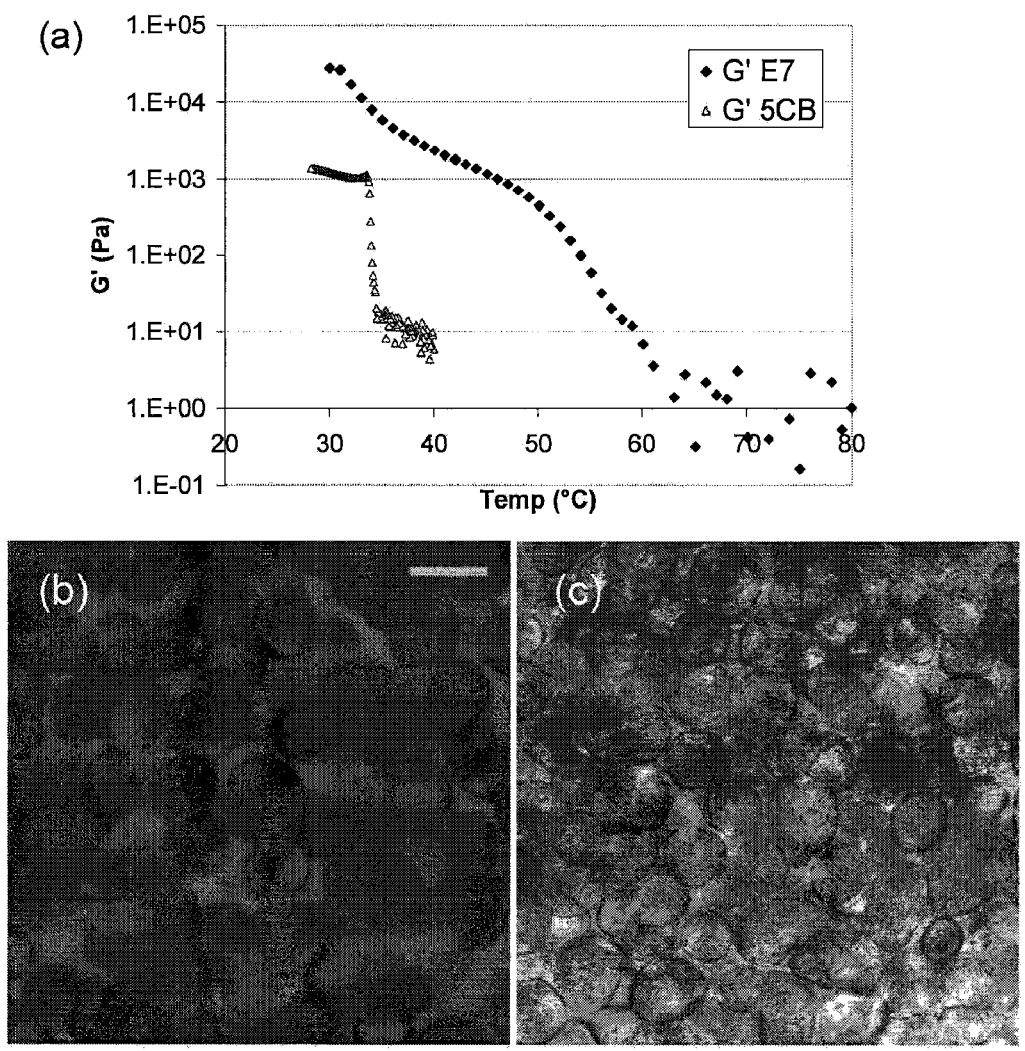
FIG. 2 shows measured (a) storage moduli of CLCGs made with 15% PS particles (1 µm diameter) suspended in E7 or 5CB. (b) A confocal section (1 µm thick) of a 100 µm-thick E7/PS gel containing 15% fluorescent PS particles. Fluorescent PS particles concentrated at the edges of the dark (particle poor) domains of E7 (scale bar=15 µm). (c) Polarized light micrograph (transmission mode) of the sample in (b), showing bright domains of nematic E7 surrounded by dark PS particles.

To determine if the CLCGs formed using PS microspheres and E7 possessed mechanical properties suitable for culture of fibroblasts, dynamic rheological measurements were performed. To permit comparison to prior studies,[10, 11] CLCGs prepared using 5CB were also characterized. FIG. 2a shows the temperature dependence of the storage modulus (G') of CLCGs containing 15 wt % PS microspheres in a small-amplitude (2% strain) oscillatory shear experiment at low frequency (2 Hz). All samples were confirmed to be in their linear visco-elastic range for these settings by varying the frequency and strain. As suspensions of PS microspheres in 5CB were cooled from 50° C. to room temperature at −1° C./min, a steep increase of almost two orders of magnitude in the storage modulus of the composite was observed at ~35° C. (the $T_{NI}$ of 5CB), followed by a further increase in the modulus upon cooling to room temperature. The abrupt increase in modulus at 35° C. is attributed to the formation of a colloidal network during the isotropic-to-nematic transition.[10] The temperature-dependent behavior of the storage modulus of composites made with E7 is also shown in FIG. 2a. Important differences between 5CB and E7 composites are evident in FIG. 2a.

Figure 3:
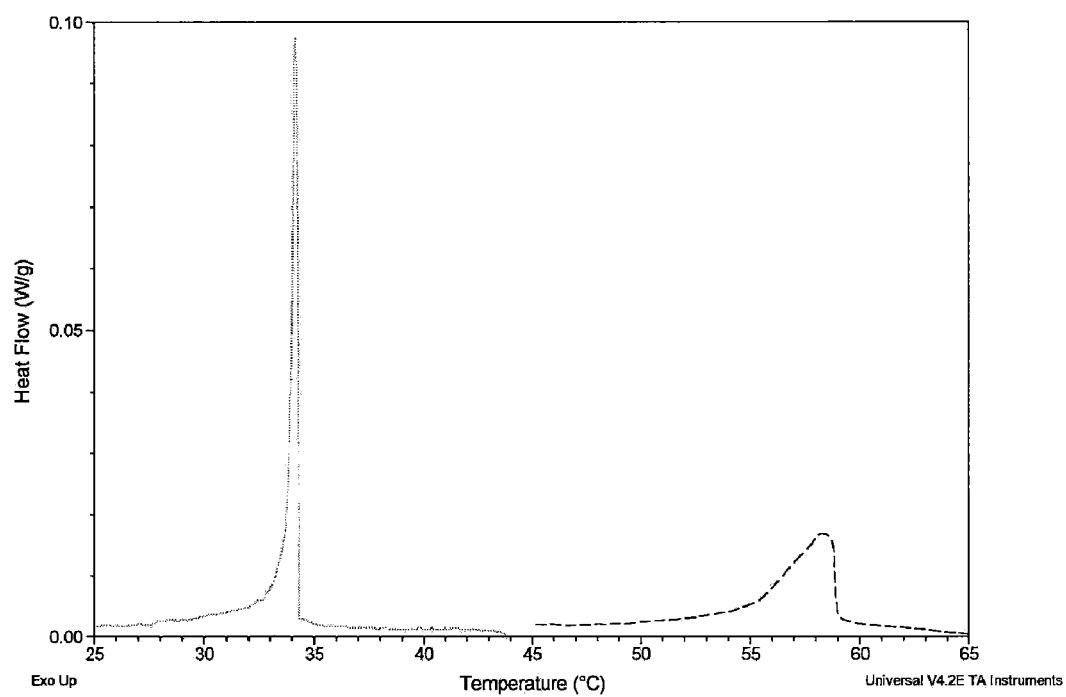
FIG. 3 shows differential scanning calorimetry results obtained from 5CB (solid line) or E7 (dashed line). The heating rate was 1° C./min.

First, the increase in G' around $T_{NI}$ for E7 was not as pronounced as for 5CB. E7 is a mixture of several mesogens, leading to an isotropic-to-nematic phase transition that occurs over a broader range of temperatures as compared to the sharp phase transition of the single component liquid crystal 5CB. Differential scanning calorimetry confirmed the broader transition for E7 as compared to 5CB. FIG. 3 shows differential scanning calorimetry (DSC) signatures for the 5CB and E7 used in the preparation of CLCGs (1° C./min) A $T_{NI}$ of 343° C. was measured for 5CB and 59.1° C. for E7. E7 contains 51 wt % 5CB, 25 wt % 4-cyano-4'-n-heptyl-biphenyl (7CB, $T_{NI}$=42.8° C.), 16 wt % 4-cyano-4'-n-oxyoctyl-biphenyl (8OCB, $T_{NI}$=80° C.), and 8 wt % 4-cyano-4"-n-pentyl-p-terphenyl (5CT, $T_{NI}$=240° C.). According to the manufacturer, the width of the peak for 5CB is likely influenced by trace amounts of nematogen with different chain lengths[11].

Figure 4A:
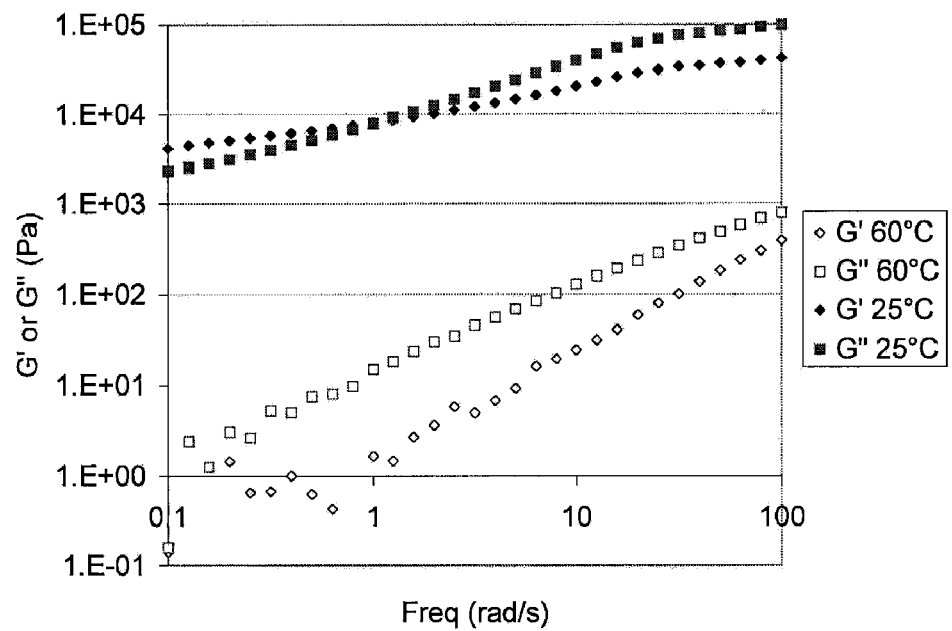
FIG. 4 shows storage (G') and loss moduli (G") of (a) a mixture of 15 wt % PS in 5CB at either 25° C. or 60° C., and (b) a mixture of 15 wt % PS in E7 at either 37° C. or 80° C.
Figure 4B:
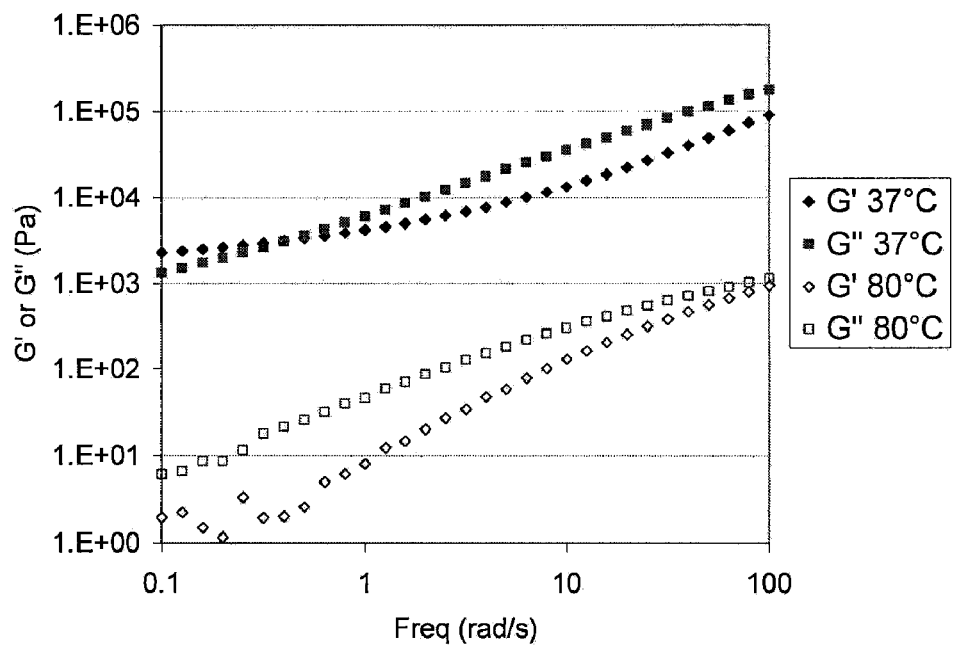

Second, on cooling below $T_{NI}$, G' for the CLCG formed using E7 increased to a value that was an order of magnitude higher than that for the CLCG made with 5CB. Dynamic frequency sweep tests on these CLCGs confirmed the formation of visco-elastic gels below the $T_{NI}$ of 5CB and E7 (FIG. 4). The rheological properties of the CLCGs at temperatures above and below their $T_{NI}$ were compared. Samples were pre-sheared (applying a constant shear of rate 1 $s^{-1}$ for 300 s). At temperatures above $T_{NI}$, the CLCGs of both 5CB and E7 exhibited a liquid-like response in a wide range of frequencies (ω), as shown in FIG. 4. However, below their $T_{NI}$ the CLCGs exhibited visco-elastic gel-like behavior. For relevance to cell-culture conditions, the shear moduli of CLCGs prepared from E7 are presented at 37° C. The curves for G'(ω) and G"(ω) cross at $\omega=\omega_g$~1 rad/s, and G' (ω)>G" (ω) for $\omega<\omega_g$. FIG. 4 shows clear signatures of gel-like behaviors for CLCGs prepared using both 5CB and E7. Additional rheological measurements confirmed that the storage modulus of CLCGs formed using E7 did not change substantially after 48 h of incubation at 37° C., and that reversible changes in the mechanical properties were observed upon reheating across the $T_{NI}$. Most significantly, FIG. 2a reveals the G' of CLCGs based on E7 at 37° C. were >5 kPa, a value that the inventors believe would be mechanically compatible with the culture of fibroblasts[8, 21, 22]. To place this value into a biological context, it is noted that many native tissues such as pig adventitial layer (4.7 kPa),[23] canine kidney cortex and medulla (10 kPa) and nucleus pulposus and eye lens (1 kPa)[24] have elastic moduli in this range.

Figure 5:
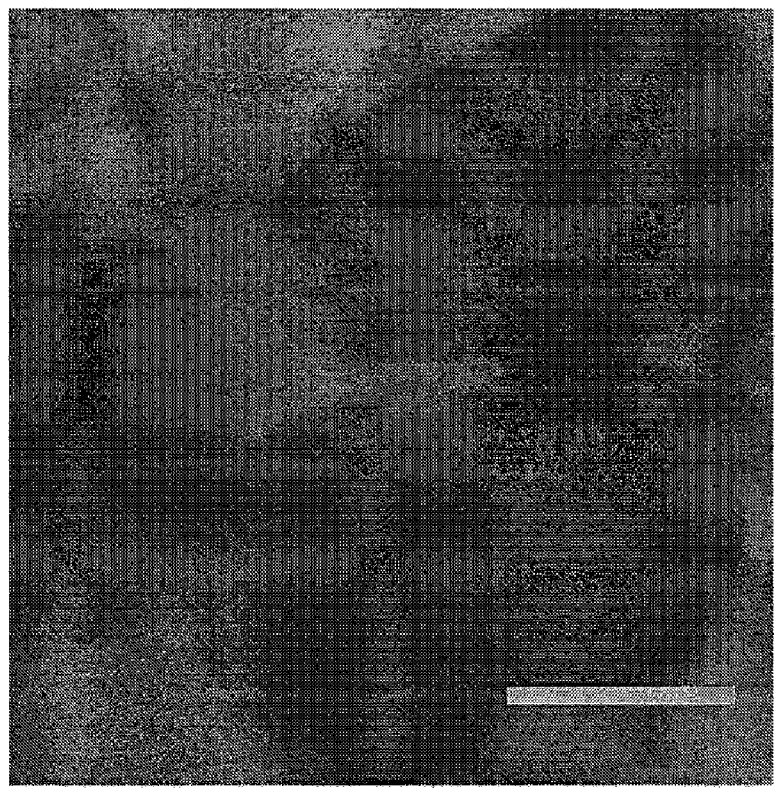
FIG. 5 shows a confocal section of a sample containing 15 wt % fluorescent PS particles dispersed in 5CB. The PS particles are concentrated around liquid crystal domains that have a dark appearance (scale bar corresponds to 5 µm).

Confocal fluorescence microscopy was used to characterize the structure of the CLCGs made with fluorescent PS microspheres (diam=1 μm).[11, 25] These experiments were performed using thin films of CLCGs, as employed below in studies of cell culture, and were prepared as follows. A piece of CLCG was cut with a blade, placed onto a glass microscope slide and heated above $T_{NI}$. As the composite transformed upon heating into a transparent suspension, the sample was covered with a glass cover slip that was spaced from the microscope slide by a distance of 100 μm. The sample was then cooled to room temperature at a rate of −0.5° C./min. As the E7 transformed from the isotropic to nematic state, a thin film of CLCG was formed between the cover slip and microscope slide. A 'cellular network-like' structure was evident within a ~1 μm thick confocal section in the middle of the 100 μm-thick composite film made from E7 (FIG. 2b). The CLCG was observed to be composed of nematic LC domains separated by walls that were rich in PS particles (as depicted schematically in FIG. 2a). Polarized light micrographs of these confocal sections showed bright LC domains surrounded by dark particle-rich boundaries (FIG. 2c), confirming localization of the LC within the dark domains evident in the micrograph in FIG. 2b. Similar micrographs were obtained for CLCG films prepared from a 5CB composite containing 15 wt % PS microspheres (FIG. 5) confocal fluorescent microscopy was used to characterize thin films of 5CB-based CLCGs prepared using methods similar to those described for E7 in the text. FIG. 5 shows a confocal section of a 4 μm-thick film of CLCG mixture containing 15 wt % fluorescent PS particles dispersed in 5CB. Similar to composites of E7, the texture of these composite films reveals nematic LC domains separated by boundaries consisting of particles. The bright fluorescent PS particles accumulated around the edges of dark domains of 5CB that are particle-poor.

To determine if the CLCGs would support mammalian cell culture, 12-15 μm-thick films of CLCGs on glass coverslips were prepared using the procedure described above. A fluorocarbon-coated glass slide was used to confine one side of the CLCG to permit subsequent removal and exposure of a surface of the CLCG for cell culture. Prior to use, the CLCG films were washed 3× with PBS. The coverslips supporting the CLCG films were then placed into sterile 6-well tissue culture plates and sterilized with UV light (268 nm) for 10 min. After sterilization, to facilitate initial adhesion of the 3T3 fibroblast cells, the CLCG films were incubated overnight with growth media containing 10% serum at 37° C. and then coated with a thin layer of gelatin. The thickness of the gelatin layer deposited onto the aqueous-CLCG interface was estimated by measuring the ellipsometric thickness of gelatin deposited onto model solid surfaces, as described above. These studies revealed the thickness of the gelatin layer to be ~35±2 nm and ~6±1 nm on hydrophobic and hydrophilic surfaces, respectively. From these studies and others reported previously,[4] the thickness of the gelatin layer coating the CLCGs was determined to be likely between 5 and 50 nm (not micrometers in thickness).

Figure 6:
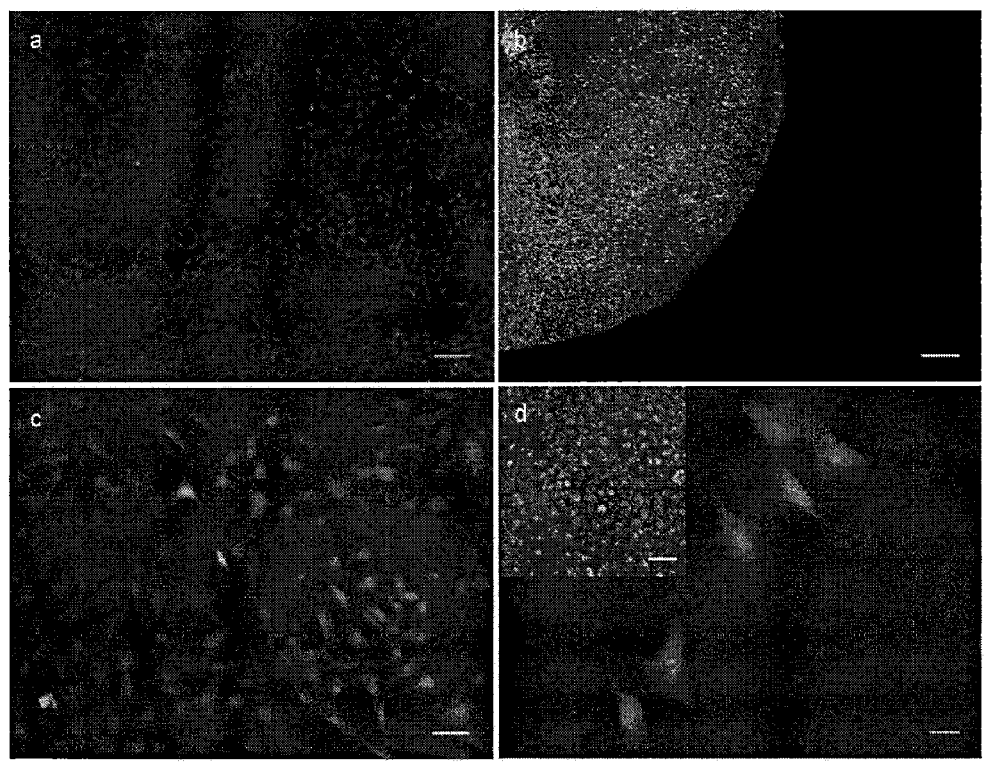
FIG. 6 shows images of fibroblast cells grown on a CLCG formed from E7 and PS particles (15 wt % PS) supported on a glass coverslip. Cells were labeled 24 hr after incubation in growth media. (a) Cells on CLCG or on glass coverslip around the CLCG, stained with live stain calcein-AM (bar—100 µm); (b) Polarized light image (crossed-polars) of the field of view in (a); (c) Cells stained with calcein-AM and Hoescht stain, on CLCG or on glass coverslip around CLCG (bar—50 µm). (d) A magnified image of cells on the CLCG, stained with calcein AM (bar—20 µm); Inset: Polarized light image of that section of (d), showing bright nematic LC domains confined by dark boundaries formed by PS colloids.

Gelatin-coated CLCG films on glass cover slips were placed into 6-well plates, seeded with $2 \times 10^5$ 3T3-fibroblast cells per well, and then inspected after a 24 hr incubation. The cells were labeled with live-dead assay reagents and Hoechst nuclei stain, as described above. As shown in FIG. 6a, fibroblasts cells were observed to attach and proliferate on the surface of the CLCGs prepared with E7. The density of cells, and thus their rate of proliferation, on the CLCGs was comparable to that observed on the glass substrate around the CLCG. The polarized light micrographs of the CLCGs in FIG. 6b confirmed that the nematic E7 remained within the CLCG during the cell culture. A fluorescence image of cells on the CLCG film is presented in FIG. 6c, with the cell nuclei labeled with the Hoescht stain. The image shows that all labeled cell nuclei are contained within live cells, consistent with the absence of dead cells on the CLCG. The cells in the lower left corner of FIG. 6 are located on the glass coverslip and therefore are not in focus (and are not blue in appearance)

at this magnification because of the thickness of the CLCG film. Because the nuclei stain was taken up by the LC, the imaging conditions had to be carefully defined so as to reveal the nuclei of the cells on the CLCG. From FIG. 6c, the area of a spread fibroblast (averaged over >50 cells) was determined to be 1650±630 µm² on the CLCG, and 2090±850 µm² on the glass coverslip. These two values are not statistically significantly different when compared using student's t-test, with a level of significance set at p<0.05. The values also correspond closely to the areas occupied by fibroblasts on glass substrates reported in literature.[8] FIG. 6d shows a higher magnification image of fibroblasts on the CLCG, along with a polarized light micrograph of the CLCG in the inset obtained at the same magnification. These images show that each cell is spread over several LC domains of the CLCG.

Figure 7:
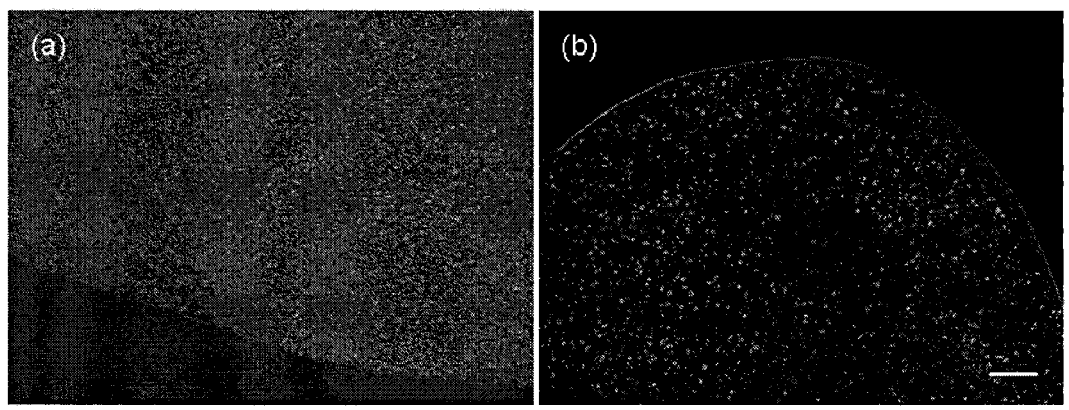
FIG. 7 shows polarized light micrographs (crossed polars) of 2 µm-thick films of CLCGs containing 15 wt % PS particles dispersed in E7, (a) between uncoated glass slides or, (b) between octadecyltrichlorosilane (OTS)-coated slides (scale bar=50 µm).

The results above demonstrate that it is possible to rigidify LCs using colloidal networks so as to realize mechanical properties that enable the adhesion, spreading and proliferation of fibroblasts. The observation that several micrometer-sized LC domains of the CLCG were covered by each fibroblast cell suggests that it may be possible to exploit the reordering of the LCs within those domains to report biomolecular and/or mechanical interactions with the LC. Past studies have demonstrated that subtle interactions between the interfaces of LCs with proteins,[2, 13] lipids,[3] or surfactants[26] can induce changes in the orientational order of the LCs. To determine if interfacial conditions can dictate the ordering of the LCs within the LC-rich domains of CLCGs, it was confirmed that the CLCGs between chemically functionalized glass microscope that give rise to known orientations of the LCs. Past reports demonstrate that OTS-treated glass causes homeotropic alignment of the calamitic thermotropic LCs used in this study.[3] When a ~2 µm-thick film of CLCG composite formed using E7 and 15 wt % PS was prepared between OTS-coated slides, a large number of LC domains appeared dark under crossed-polars, as shown in FIG. 7b. This observation indicates that LC was homeotropically aligned in the LC-rich domains. In contrast, bright LC domains were observed in CLCG films prepared between uncoated glass slides (FIG. 7a), thus indicating that the nematic LC in the domains confined by colloids can still order in response to changes in boundary conditions (i.e., surface anchoring). The thin films of CLCGs were comprised of LC domains that extended across the entire film thickness.

Example 2

Preparation of CLCGs with a Solvent Evaporation Method

This example illustrates an alternative method of forming a CLCG. In this example, a solvent is used to transform the LC into an isotropic phase.

Liquid crystal 5CB was dissolved in an equal amount of ethanol at room temperature in an eppendorf tube to form an isotropic phase. Dried polystyrene (PS) microspheres (10-20 wt %) were then suspended in a 5CB/ethanol mixture. The suspension was vortexed and sonicated vigorously with extensive shaking and tumbling for an hour to ensure homogenous dispersion of the colloids based on visual inspection, and then left at room temperature overnight to allow the evaporation of ethanol from the system. A fine, waxy CLCG was obtained next day.

Example 3

Particle Size and Concentration Dependence of Liquid Crystal Domain Size

This example demonstrates the effect of colloid particle size and concentration on the dimensions of the LC domains in a CLCG.

Figure 8:
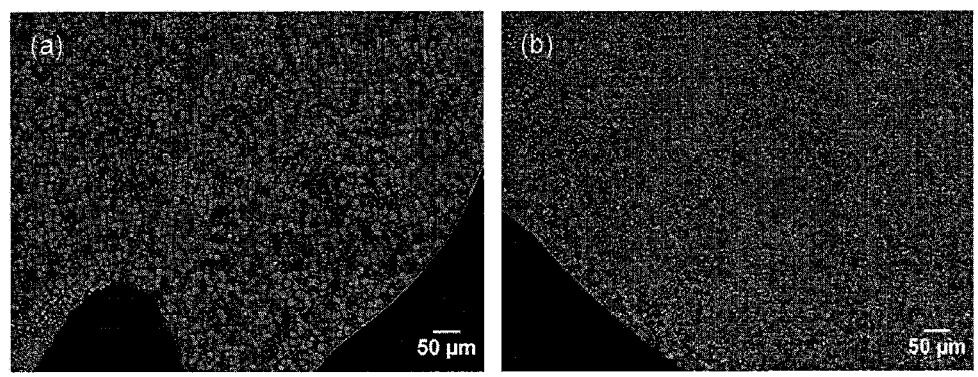
FIG. 8 shows micrographs demonstrating dependence of the size of LC domains in thin films (~2-4 µm thick) of CLCGs on the size of particles used to prepare the CLCG. (a) CLCG film prepared using 1 µm size PS particles, and (b) CLCG film prepared using 200 nm size PS particles.
Figure 9A:
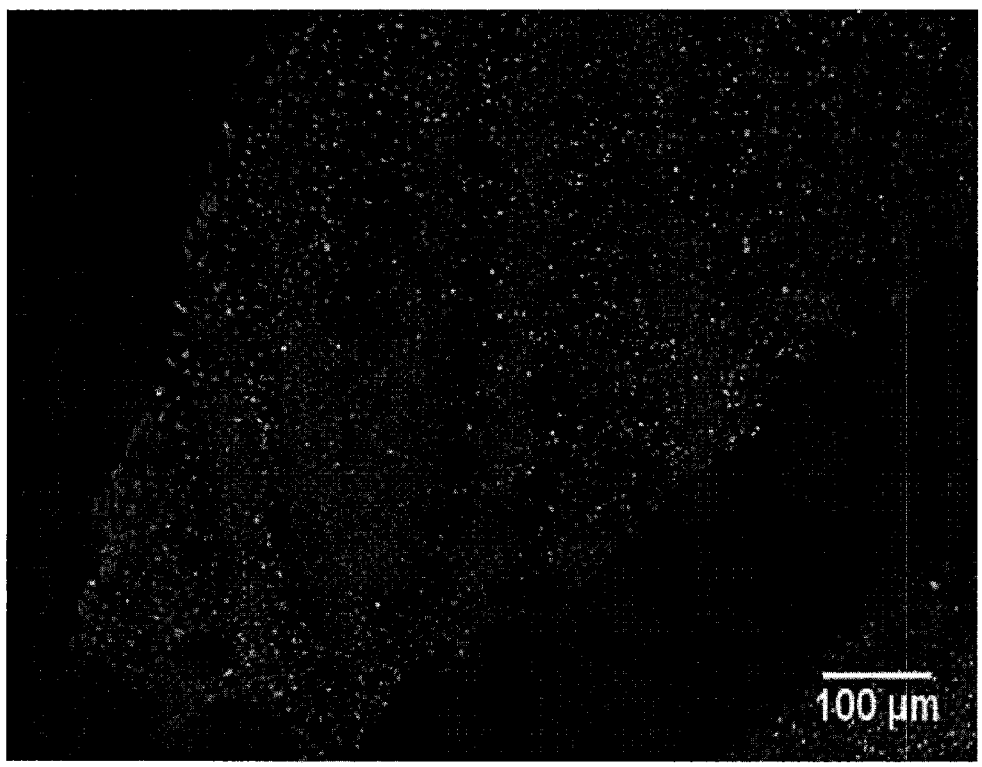
FIG. 9 shows polarized light micrographs (crossed polars) of a CLCG on an OTS-coated glass slide as the liquid crystal interface is contacted sequentially with: (a) air, (b) water, and then (c) a 3 mM solution of dodecyl trimethyl ammonium bromide.
FIG. 9(d) shows a graph of the mean light intensity of the CLCG.
Figure 9B:
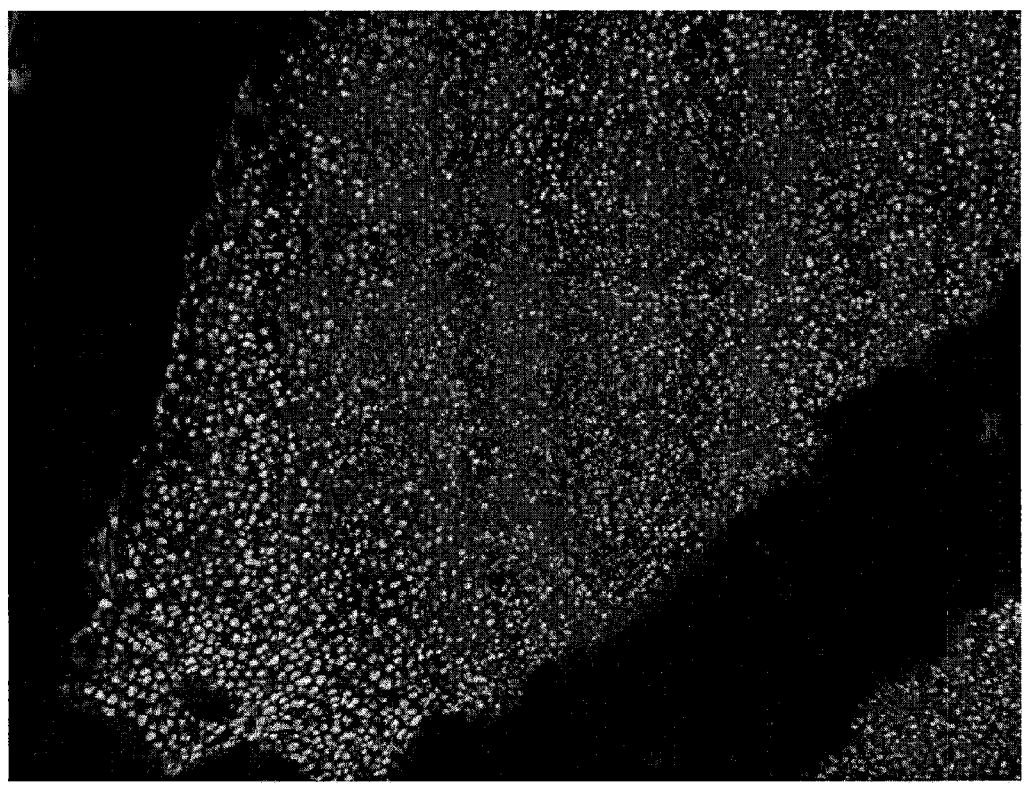
Figure 9C:
Figure 9D:
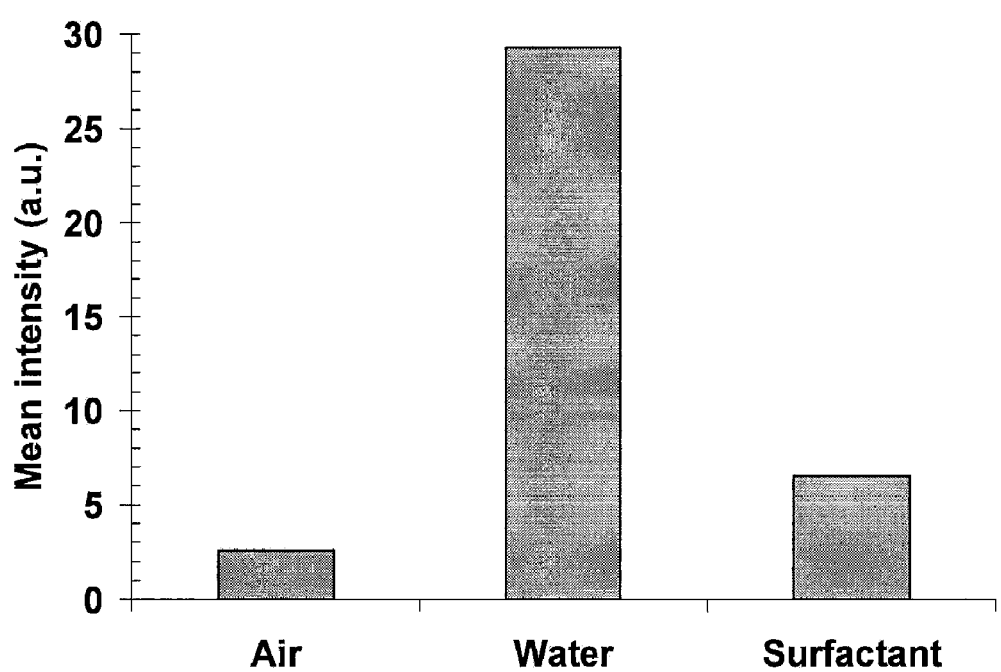

Sulfate coated polystyrene (PS) particles of 200 nm or 1 µm diameter were used to prepare colloid-in-liquid crystal gels. The size of the particles affected the size of LC domains in CLCGs, as shown in FIGS. 8a and 8b. While LC domain size was ~12-15 µm diameter in CLCGs prepared with 1 µm PS particles (FIG. 8a), it was ~5-9 µm diameter in gels prepared with 200 nm size particles, (FIG. 8b). The CLCG films shown in FIGS. 8a and 8b contain 15 wt % PS particles dispersed in liquid crystal 5CB, and were prepared between two glass slides separated with 2 µm spacers.

The sizes of LC domains in CLCGs were also tailored by controlling the weight percent of PS particles in the gels. A smaller weight percent of particles produced larger LC domain sizes. CLCGs films similar to the ones shown in FIG. 8, contained LC domains of ~8 µm for gels made with 20 wt % PS particles (1 µm diameter microspheres), ~12 µm for gels made with 15 wt % particles, and ~16 µm for gels made with 10 wt % particles.

Example 4

CLCG-Based Sensor

This example demonstrates the use of a CLCG on an octadecyltrichlorosilane-functionalized glass substrate as a chemical sensor for detecting surfactants.

Treatment of glass microscope slides with OTS: Glass microscope slides (Fisher's Finest) were cleaned with piranha solution for 1 hour at approximately 80° C. The slides were then rinsed with water, ethanol, and methanol and dried under a stream of nitrogen followed by heating to ~110° C. for less than 2 hours prior to OTS deposition. A 0.5 mM OTS solution was prepared by adding OTS to dry heptane (20 µL of OTS was added to 100 mL of dry heptane). The piranha-cleaned glass slides were immersed in the 0.5 mM OTS in heptane for 30 min at room temperature. They were rinsed with methylene chloride and dried under nitrogen followed by heating to ~100° C. for 2 hours.

Formation of CLCG films on OTS-coated glass slides: Thin films of CLCG on OTS-coated glass slides were prepared as follows. A small piece of CLCG was placed on an OTS-coated glass slide (first surface) and heated above $T_{NI}$. As the gel formed a transparent suspension, it was covered with a similar prewarmed OTS coated slide (second surface) using 2 µm thin spacers. The assembly was clamped with binder clips and cooled at a fixed rate (0.5° C./min) to room temperature. Finally, the second surface was carefully removed so that the single domains of CLCG extended from the first surface to the second one. FIG. 9 (a) shows the orientation of liquid crystal domains (CLCG-air interface) of the CLCG hosted on the OTS-coated glass slide. The optical texture was examined using polarized light which shows homeotropic anchoring (dark between crossed polars, FIG. 9 (a)).

CLCG thin films in contact with an aqueous phase (water, $H_2O$): The CLCG supported on an OTS-coated glass slide was immersed in an aqueous solution of deionized water with a resistivity of 18.2 MΩ cm. The LC domains of the CLCG immediately became bright as examined using plane polarized light in transmission mode with crossed polars, indicating that the LC assumed a tilted or planar orientation at the interface with the water. FIG. 9 (b) shows the change in the orientation of LC domains of the CLCG hosted on the OTS-coated glass slide as the interface is changed from air to water (dark to bright between crossed polars).

Influence of surfactant (Dodecyl trimethyl ammonium bromide, DTAB) self-assembly at aqueous-CLC interface: An aqueous solution of dodecyl trimethyl ammonium bromide (3 mM, 46 mg of DTAB was added to 50 ml of deionized water) was prepared. The DTAB solution was exchanged for the water in contact with the CLCG on the OTS-coated glass slide at room temperature. The CLCG domains became dark when viewed with crossed polars. The change in optical appearance of the LC in FIG. 9 (c) was caused by the change in orientation of LC in the LC domains of the CLCG hosted on the OTS-coated glass slide as the LC interface was exchanged from water to surfactant solution.

Example 5

CLCG-Based Sensor

This example demonstrates the use of CLCG on a copper perchlorate-functionalized gold surface as a gas-phase chemical sensor for organophosphates.

Materials and Methods:

Materials: 11-Mercaptoundecanoic acid (MUA) was purchased from Sigma-Aldrich (Milwaukee, Wis.). Titanium (99.999%) and gold (99.999%) were purchased from Advanced Materials (Spring Valley, N.Y.). Hydrated perchlorate salts of Cu(II) [$CuCl_2O_8$, $6H_2O$] were purchased from Sigma Aldrich. Dimethyl methylphosphonate (DMMP, a stimulant of organophosphorous nerve agents) in nitrogen at a nominal concentration of 10 ppm was obtained from Linweld Inc. (Des Moines, Iowa).

Preparation of chemically functionalized surfaces: First, 80 Å of titanium and 200 Å of gold were deposited sequentially onto piranha-cleaned glass slides (Fisher's Finest) by using an electron-beam evaporator (Tek-vac Industries, Brentwood, N.Y.). The rate of deposition of titanium and gold was 0.2 Å/s and 1 Å/s, respectively. The pressure in the evaporator was maintained below $2 \times 10^{-6}$ torr throughout the evaporation. Self-assembled monolayers (SAMs) were formed on the surfaces of the gold films overnight by immersion of the films into ethanolic solutions containing 2 mM of 11-mercaptoundecanoic acid. The gold films were rinsed with ethanol and dried under a stream of nitrogen. Metal ions ($Cu^{2+}$) were coordinated to the carboxylic acid-terminated SAMs by soaking the samples in 25 mM ethanolic solutions of Cu-perchlorates for 10 minutes and then rinsing them thoroughly in ethanol. Finally, excess perchlorate salts were deposited onto the surfaces by spin coating 30 µL of 4.5 mM Cu-perchlorate salt in ethanol at 3000 rpm for 60 s (WS-400A-6NPP/Lite, Laurell Technologies, North Wales, Pa.).

Formation of CLCG films on chemically-functionalized surfaces: Thin films of CLCG were prepared as follows. A small piece of CLCG was placed on a chemically-functionalized gold coated glass slide (first surface, as described above) and heated above $T_{NI}$. As the gel formed a transparent suspension, it was covered with a similar prewarmed functionalized surface (second surface) using 2 µm thick spacers. The assembly was clamped with binder clips and cooled at a fixed rate (0.5° C./min) to room temperature. Finally, the second surface was carefully removed so that the single domains of CLCG extended from the first surface to the second one.

Figure 10:
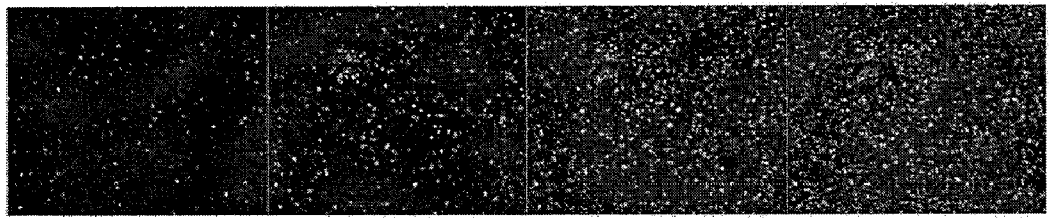
FIG. 10 shows polarized light micrographs (crossed polars) of a CLCG on a copper perchlorate-functionalized gold-coated glass slide over a period of 80 seconds following exposure of the CLCG to a stream of air containing dimethylmethylphosphonate (DMMP).

Results:

Detection of gas phase analytes (DMMP) using CLCG films supported on a chemically-functionalized surface: Prior to analyte (gas phase analyte, DMMP) exposure, a CLCG film supported on a chemically-functionalized surface was photographed (between crossed polars) in the exposure chamber. 0.2 µL of diluted DMMP (having a concentration of about 100 ppm) was pipetted onto a folded filter paper and placed in the exposure chamber adjacent to the CLCG-supported slides. The glass window was replaced to close the cell and the CLCG film was photographed repeatedly over a period of 0-80 seconds (FIG. 10). Liquid crystal in the CLCG, prior to analyte exposure (0 seconds, FIG. 10) showed homeotropic anchoring (dark under crossed polars). On exposure to the volatile compound DMMP, the CLCG showed an initial response from dark to bright (from homeotropic to planer/tilted orientation) within 20 seconds. Similar transitions were seen with 5 ppm DMMP within 60 seconds.

Example 6

CLCG Based Sensor

This example describes the preparation of microstructured, liquid crystalline gels that undergo changes in orientational order and thus optical appearance in response to exposure to vapors of model organophosphonate compounds. In contrast to previous studies that have used thin films of low molecular weight liquid crystals (LCs), (see, K. D. Cadwell, M. E. Alf, N. L. Abbott, *The Journal of Physical Chemistry B* 2006, 110, 26081; K.-L. Yang, K. Cadwell, N. L. Abbott, *The Journal of Physical Chemistry B* 2004, 108, 20180) the microstructured LC gels reported here are mechanically stable and easily processed (e.g., by molding).

The sensor described herein is based upon adsorbate-induced ordering transitions in LCs supported on chemically functionalized surfaces. The surfaces are designed to present chemical functional groups that trigger orientational ordering transitions within LCs upon binding of targeted analytes. The results demonstrate the use of organized networks of micrometer-sized particles to form CLCGs that are mechanically stable and easily processed, yet retain their responsiveness to changes in their chemical environment.

The CLCGs of this example were comprised of networks of micrometer-sized polystyrene (PS) spheres formed within nematic LCs. The CLCGs were prepared by cooling a mixture of sulfate-coated PS microspheres and mesogens from an isotropic phase into a nematic phase. They are mechanically robust yet possess large LC-rich domains that lie between the networks of microparticles that lead to gelation. The size of the LC-rich domains in these CLCGs were as large as 10-15 µm, making it possible to trigger adsorbate-induced ordering transitions within these domains by forming the gels in thin films (thickness comparable to domain size) on chemically functionalized surfaces. Although the LC rich domains in these materials were relatively large (micrometer-scale), the CLCGs could be molded and possess mechanical properties rendering them self-supporting and easily handled. In addition, that LC domains in the thin film CLCGs, when supported on chemically functionalized surfaces, underwent easily visualized ordering transitions upon exposure to organophosphonate compounds.

The CLCGs were prepared using a low molecular weight liquid crystal E7 as previously described in Example 1. E7 is a mixture of four alkylcyanobiphenyls with different aliphatic chain lengths: 51 wt % 5CB, 25 wt % 4-cyano-4'-n-heptyl-biphenyl (7CB), 16 wt % 4-cyano-4'-n-oxyoctyl-biphenyl (8

CB) and 8 wt % 4-cyano-4"-n-pentyl-p-terphenyl (5CT). Briefly, PS microspheres (diameters ~1 μm), washed in ethanol and dried at room temperature for several days, were weighed and dispersed in E7 heated above its nematic-to-isotropic phase transition temperature ($T_{NI}$~59° C.) in an Eppendorf tube placed in an oven or water-bath. The suspension was vortexed and sonicated vigorously with extensive shaking and tumbling for several hours to ensure formation of a homogenous dispersion of microparticles. Care was taken to work below the glass transition temperature (Tg) of PS, which is around 100° C. The suspension of microspheres, heated to ~80° C. in an oven, was then cooled at a fixed rate (−0.2° C./min, see Experimental section, below, for details) to room temperature. As E7 transformed from the isotropic to nematic state upon cooling, the CLCG suspension fanned a birefringent gel-like composite.

Figure 11A:
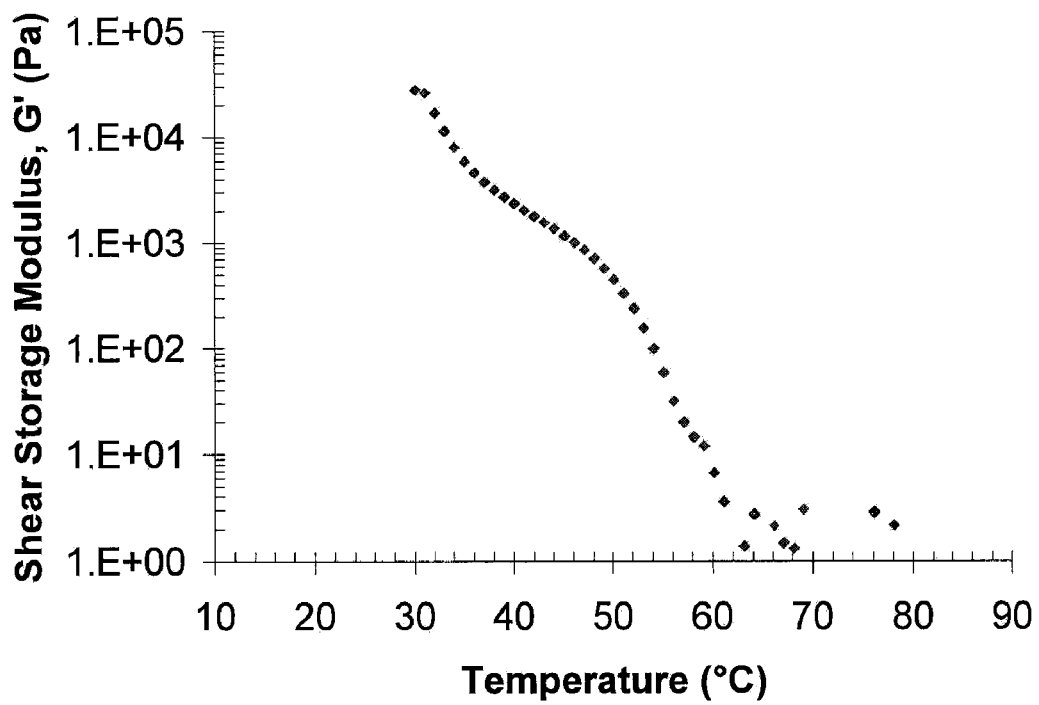
FIG. 11 shows: (a) the temperature dependence of the dynamic shear storage modulus (G') of a CLCG prepared from 15 wt % PS microspheres (1 µm diameter) dispersed in E7; (b) dynamic shear storage (G') and loss (G") moduli of a CLCG (E7/15% PS) as a function of the frequency of oscillation (ω) in a small amplitude (2% strain) oscillatory shear experiment; and (c) the fluorescent micrograph of a confocal section (1 µm thick) of a 4 µm thick film of CLC gel (E7/15% PS) prepared with fluorescently-labeled PS microspheres (1 µm diameter), showing bright PS microspheres expelled from dark nematic domains; scale bar—15 µm, in accordance with Example 6.
Figure 11B:
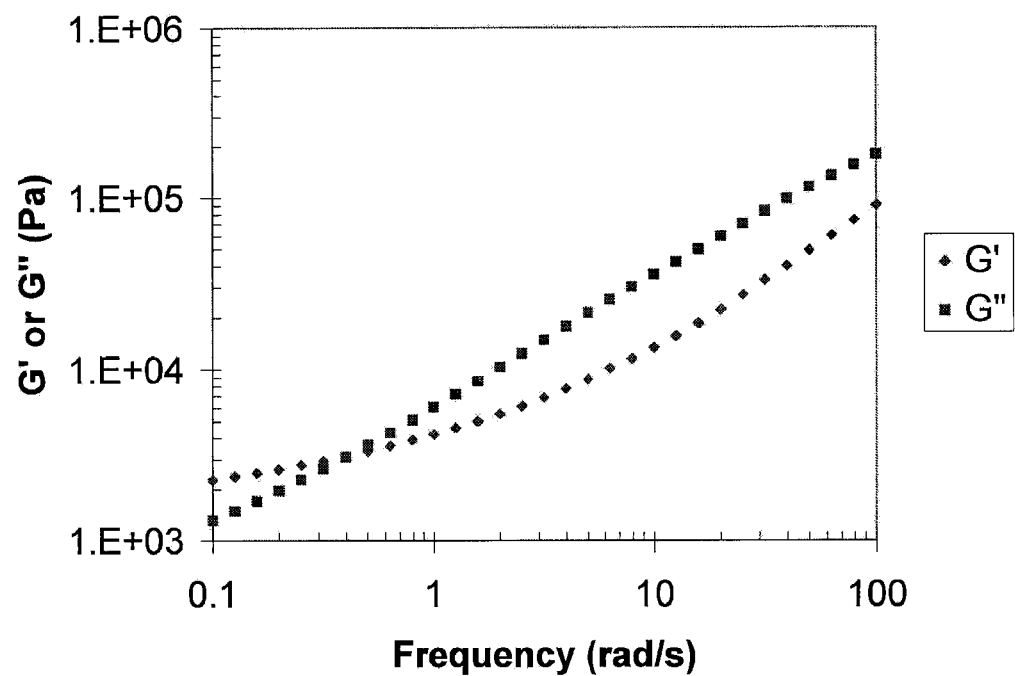

To characterize the mechanical properties of the CLCGs, dynamic rheological measurements were performed using the shear strain-controlled mode of an ARES rheometer in a parallel-plate geometry (see Experimental section for details). Samples were pre-sheared by applying a constant shear of rate 1 s$^{-1}$ for 300 s. FIG. 11*a* shows the temperature dependence of storage modulus (G') of a CLCG of E7 containing 15 wt % PS microparticles in a small-amplitude (2% strain) oscillatory shear experiment at low frequency (2 Hz). All samples were confirmed to be in their linear visco-elastic range by separately measuring their shear modulus in dynamic frequency and dynamic strain sweep tests. FIG. 11*a* shows that as suspensions of PS microspheres in E7 were cooled from 80° C. to room temperature at −1° C. min$^{-1}$, an increase of almost three orders of magnitude in the storage modulus of the composite was observed during cooling ~10° C. below the $T_{NI}$ of E7 (~59° C.), followed by a further increase in the modulus when the gel was cooled to room temperature. The increase in the storage modulus around the $T_{NI}$ of E7 is attributed to the formation of a colloidal network during the isotropic-nematic transition. These experiments confirm that the dispersion of PS microparticles in E7, which was free flowing above the $T_{NI}$ of E7 (G'<1 Pa), formed a mechanically strong composite when cooled below the $T_{NI}$ of E7 (G'>10 kPa at room temperature). To characterize the visco-elastic nature of CLCGs formed below the $T_{NI}$ of E7, dynamic frequency (ω) sweep tests were performed in the shear strain-controlled mode. FIG. 11*b* shows that the storage modulus G'(ω) and loss modulus G"(ω) cross at ω=$ω_g$~1 rad/s, and that G'(ω)>G"(ω) for ω<$ω_g$. A visco-elastic gel is characterized by G'(ω)→const≠0 and G"(ω)→0 as ω→0; this implies G'(ω)>G"(ω) at sufficiently low frequencies. In contrast, for a liquid G'(ω)/G"(ω)→0 as ω→0. FIG. 11*b* thus provides the clear signature of visco-elastic gel-like behavior.

Figure 12:
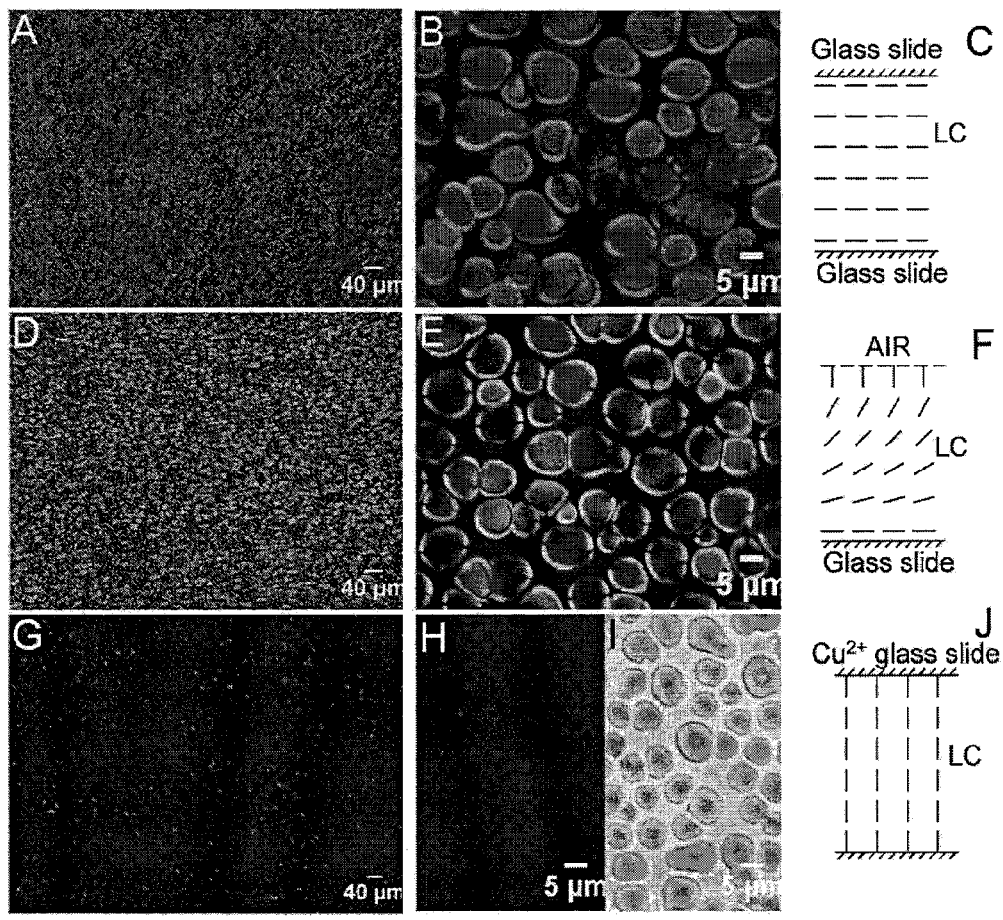
FIG. 12 shows polarized light micrographs (crossed polars) of thin films of CLCG (E7 containing 10 wt % PS microspheres): (a,b) CLCG confined between two glass slides spaced apart by using 2 µm-thick Mylar film, at 4× and 50× magnification, respectively; (c) illustration of the orientation of the LC-rich domains between the glass surfaces; (d,e) CLCG film, prepared between two glass slides, after the removal of top glass slide at 4× and 50× magnification, respectively; (f) illustration of the splay/bend distortion of the LC-rich domains after removal of top glass surface; (g,h) CLCG confined between two copper perchlorate-functionalized surfaces at 4× and 50× magnification, respectively; (i) bright-field image of (h) showing network of LC-rich domains; and (j) illustration of the orientation of the LC-rich domains between the confining copper perchlorate-functionalized surfaces.

Next, thin films of the CLCGs were formed. A small piece of CLCG prepared as described above was placed on a piranha-cleaned (see Experimental section for details) glass slide and heated above $T_{NI}$ of E7. After the CLCG had melted, it was confined with another piranha-cleaned glass slide, with ~2 μm-thick Mylar spacers placed between the two glass slides, and cooled to room temperature. After evaluating several different cooling rates, it was determined that a cooling rate of −0.2° C. min$^{-1}$ led to thin films of gels that contained large (uniform) LC domains. FIG. 12*a* and *b* show polarized light micrographs (crossed polars) of a thin film of CLCG (containing 10 wt % PS particles) prepared between the glass slides, revealing a gel comprised of bright birefringent domains of nematic LC, with sizes of 9.2±1.6 μm, separated by optically dark walls.

Figure 11C:
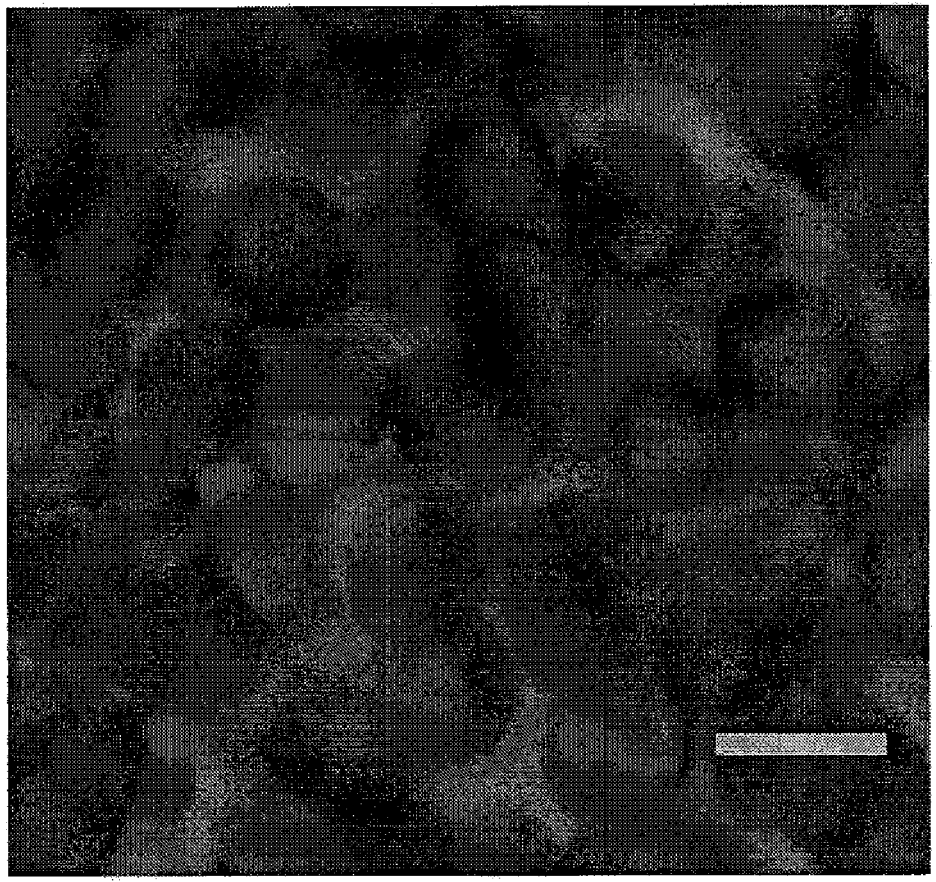

To characterize the microstructure of the colloidal networks within the CLCGs, thin films of gels containing fluorescently-labeled PS microspheres were prepared between glass slides spaced apart using ~4 μm-thick spacers and imaged by confocal microscopy. FIG. 11*c* shows that the microspheres form a bright network that percolates through dark, LC-rich domains. These networks of microspheres likely are formed by expulsion of microspheres from LC-rich domains that nucleate and grow during the cooling of the system. Interestingly, neither the hindered mobility of the microspheres within the thin film of E7 (the thickness of the gel was measured to be ~4 μm, nor surface-induced nucleation and wetting of the nematic phase on the surfaces of the glass slides during cooling of the E7, prevented formation of the colloidal network that rigidifies the gel.

From the micrograph images, it was evident that the LC domains span the thickness of the gels (i.e. extend from one glass surface to the other), thus giving rise to uniform interference colors. In particular, the magenta interference colors generated by the LC were consistent with planar anchoring of the LC at the confining glass surfaces, as illustrated schematically in FIG. 12*a*. The variation in the interference color that was evident towards the edge of each LC domain indicates some change in the order of LC, likely due to the interaction of the LCs with the surfaces of the PS microspheres. To characterize the anchoring of E7 on the surfaces of the sulfate-coated PS microspheres (1 μm dia), a suspension of the PS microparticles dispersed in E7 was observed between crossed polars. Evidence of defects in the LC that would indicate strong anchoring of the LC on the surfaces of the microparticles was not observed. From this it can be concluded that the E7 is likely weakly anchored on the surfaces of the PS microspheres. It was further observed that the size of the LC domains in the thin films of the CLCGs could be manipulated by varying the loading (wt %) of PS microparticles dispersed into the E7: Thin films of CLCGs containing 15 wt % PS microparticles possessed LC-rich domains with diameters of 5 to 7 μm, whereas gels prepared using 5 wt % PS microparticles formed gels with domains that ranged from 5 to 15 μm. The results reported below were obtained using gels prepared from 10 wt % PS microparticles.

Whereas the experiments described above establish the feasibility of forming CLCGs in a thin film geometry between two solid surfaces, in order to study the response of the CLCGs to chemical vapours, the cellular structure of the gel following detachment of the top glass slide (to create an interface between the gel and air) was studied. Inspection of the polarized light micrographs revealed that removal of the top glass slide from the thin film of CLCG did not destroy the structure of the CLCG, but did lead to a change in the optical appearance of the LC-rich domains. In particular, the interference colours at the centre of the LC-rich domains became dark blue or black. Past studies have established that E7 assumes a perpendicular (homeotropic) orientation at its free surface (air-LC interface), and thus it was concluded that, after removal of the top glass surface, the orientation of the LC within the LC-rich domains undergoes an orientational transition resulting in the introduction of a splay/bend deformation (see schematic illustration in FIG. 12B) in order to accommodate the new boundary conditions. This result also suggests that the LC within the domains of the gel can respond to changes in the structure of the confining interfaces (in this case, from glass to air).

As noted above, the CLCGs comprised an internal network of microparticles that are formed by the nucleation and growth of the nematic domains during cooling of the E7 from the isotropic phase. To determine if it was possible to prepare the CLCGs confined by surfaces with chemical functionality suitable for triggering ordering transitions in the LC upon exposure to organophosphonates, gold-coated glass slides functionalized with $Cu^{2+}$ ions were prepared so as to cause homeotropic alignment of the nitrile-containing LC (see Experimental section for details of the chemical functionalization). Polarized light micrograph images were taken to observe the optical appearance of a mixture of E7 and PS microspheres between $Cu^{2+}$-functionalized surfaces that was cooled across the $T_{NI}$ of E7 into the nematic phase at the fixed cooling rate of $-0.2°$ C. $min^{-1}$. Almost complete extinction of light was observed between cross-polarizers only a small amount of light scattered from the film was evident. A bright field image of the film confirmed the presence of a network of LC-rich domains. These polarized light and bright-field micrographs, when combined, indicate that (i) the CLCG formed in contact with the $Cu^{2+}$-functionalized surfaces, and (ii) the E7 within the LC-rich domains of the gel assumed a homeotropic orientation (shown schematically in FIG. 12c). Removal of the top $Cu^{2+}$-functionalized surface from the CLCG did not change the optical appearance of the film of CLCG, as the free surface of E7 assumed the same homeotropic orientation as that caused by the $Cu^{2+}$-functionalized surface.

Figure 13:
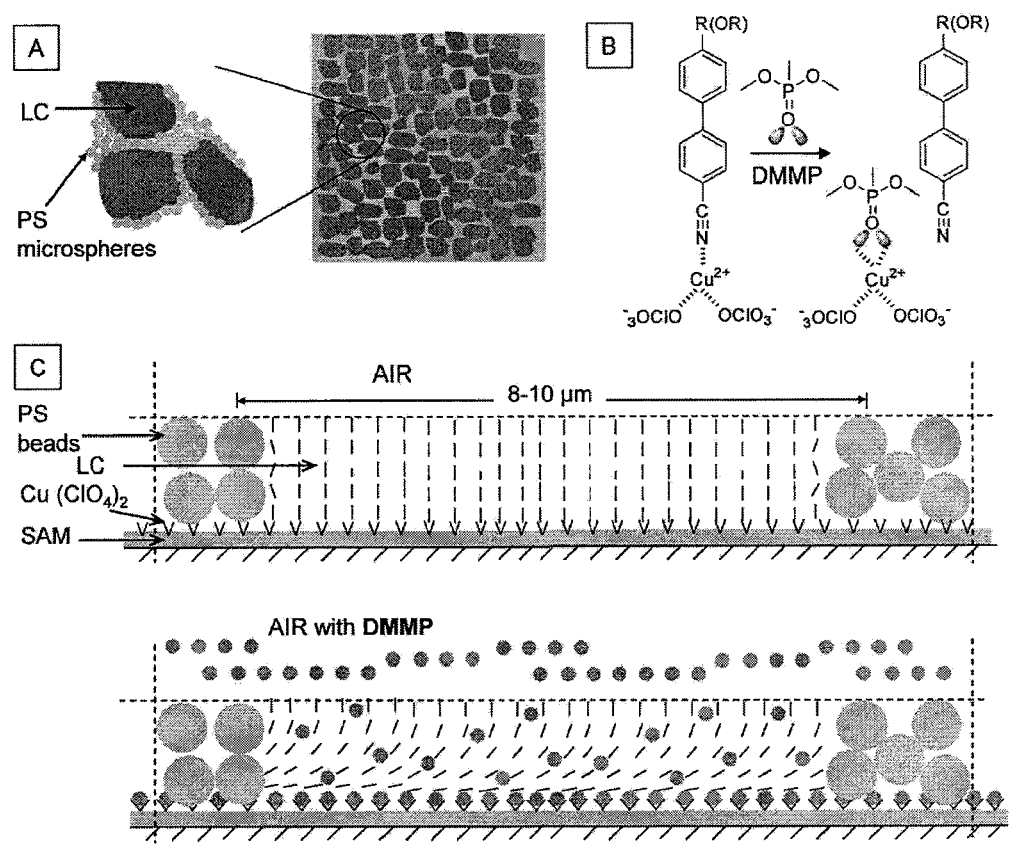
FIG. 13 shows a schematic illustration of DMMP-responsive thin films of CLCGs formed on chemically functionalized surfaces: (a) a thin film of CLCG comprised of LC-rich domains separated by a network of PS microspheres; (b) an illustration of competitive coordination interactions between nitrile groups of LC and phosphoryl groups of DMMP with $Cu^{2+}$; displacement of the nitrile group from coordination with $Cu^{2+}$ upon exposure to DMMP triggers an ordering transition in the LC-rich domains of the gel; (c) top: schematic illustration of a LC-rich domain in a thin film of CLCG prepared on a $Cu^{2+}$ functionalized surface; binding of the nitrile groups of the LC to the $Cu^{2+}$ leads to a perpendicular (homeotropic) orientation of the LC at the chemically functionalized surface; bottom: exposure of the CLCG to a vapour of DMMP results in diffusion of DMMP to the $Cu^{2+}$-functionalized surface, and the triggering of an ordering transition in the LC via displacement of the nitrile groups of the LC from their coordination interactions with the $Cu^{2+}$.

To determine if the LC-rich domains of the CLCGs supported on the $Cu^{2+}$-functionalized surfaces would undergo orientational ordering transitions induced by adsorbates, a thin film of the CLCG was exposed to a vapor of dimethyl methylphosphonate (DMMP). In order to expose the thin film of CLCG to DMMP, the supported CLCG was placed in a closed glass chamber set on an inverted microscope (Olympus IX-71). Vapors of DMMP were generated inside the chamber by placing a small drop of liquid containing DMMP on a filter paper located in the chamber. To control the vapor pressure of DMMP in the chamber in the parts-per-million range, the DMMP was diluted into tetradecane. Note that tetradecane has a sufficiently low volatility (0.0116 mm of Hg @ 20° C., 15 ppm) that it can be viewed as an inert carrier in this experiment. The maximum possible concentration of DMMP in the glass chamber was calculated to be ~100 ppm (assuming all DMMP introduced into the chamber was volatilized during the experiment). Inspection of time-lapse images of the CLCG (FIG. 14a) showed that the CLCG, when viewed between cross-polars, transformed from having a dark optical appearance to a bright one over approximately 80 s following the introduction of the DMMP-containing tetradecane into the chamber. The initial indication of the ordering transition within the CLCG was evident within 20 s of the introduction of DMMP. The bright optical appearance assumed by the LC is consistent with an ordering transition in the LC that is triggered at the $Cu^{2+}$-functionalized surface by binding of DMMP (see below for additional experimental observations that support this conclusion). In brief, as shown schematically in FIG. 13c, binding of DMMP to the $Cu^{2+}$-functionalized surface causes the nitrile group of the LC to be displaced from coordination with the $Cu^{2+}$ ions, resulting in a tilt of the optical axis of the LC away from the surface normal of the $Cu^{2+}$-functionalized surface. The tilt of the LC leads to an increase in the retardance of polarized light passing through the LC, resulting in the bright optical appearance. Two additional control experiments were preformed to establish the role of the $Cu^{2+}$-functionalized surfaces in the above-described response of the CLCGs to DMMP. There was no optical response when CLCGs prepared (as described above) on OTS-treated glass microscope slides were exposed to DMMP vapors. There was also no change in the optical appearance of the CLCG films hosted on $Cu^{2+}$ functionalized surfaces when they were exposed to 400 ppm of ether, water, acetone, hexane, or ethanol vapors. These vapors did not compete with the nitrile groups of E7 for coordination with $Cu^{2+}$. These results show that adsorbate-induced ordering transitions can be driven within the LC-rich domains of thin films of CLCGs supported on chemically functionalized surfaces.

Figure 14C:
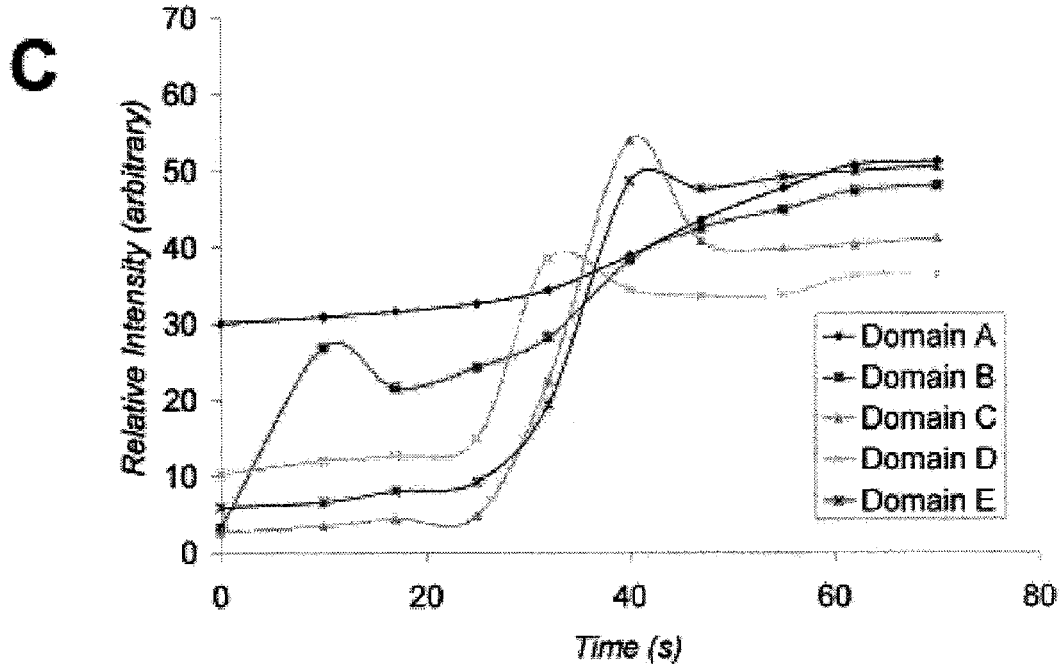
FIG. 14 (a) shows: time-lapse images (crossed polars) of a CLCG supported on $Cu^{2+}$-functionalized surfaces following exposure to a vapor of DMMP (the scale bar corresponds to 30 µm) (also shown in FIG. 10); (b) a high magnification images of a representative region of the CLCG that illustrates the different types of dynamical responses of LC-rich domains upon exposure to DMMP (the scale bar corresponds to 10 µm); and (c) the time-dependent optical appearance (brightness) of the five domains shown in (b) upon exposure to DMMP.

As noted above, the change in optical appearance of the CLCG upon exposure to DMMP occurred over 80 seconds. To provide insight into the origins of this dynamic response, experiments were conducted to determine if each individual LC-rich domain of the CLCG underwent a continuous ordering transition over the 80 s interval of time, or if the individual domains were undergoing rapid ordering transitions at different points in time during the 80 s interval of time. To distinguish between these two physical scenarios, high magnification images of a region of the CLCG comprised of approximately 15 LC-rich domains were obtained (FIG. 14b). For five of the LC-rich domains in the images of the CLCG, the time-dependent optical response of each domain is shown in FIG. 14c. Careful inspection of FIG. 14 reveals that the domains exhibit three types of responses. First, the most common type of LC-rich domain behavior is illustrated by domains C-E. The initial state of these domains corresponds to homeotropic alignment (dark optical appearance between crossed-polars). Approximately 30 s after introduction of the DMMP into the exposure chamber, these domains undergo a relatively rapid change in optical appearance that is largely complete within ~10 s. Although the magnitude of the change in brightness of the LC-rich domains varies between domains C-E, the optical brightness of each domain is dependent on the azimuthal direction of tilt of the optical axis within the domain relative to the polarizers. Thus, the variation in brightness may reflect different azimuthal tilts of the LC within each domain. Curiously, however, each of the three domains (C-E) exhibit a transient bright state that possesses a higher gray-scale brightness than the final state. These effects are likely due to transient interference effects associated with the time-dependent retardance of the LC domains and white-light illumination. In addition to this typical LC-rich domain behavior, two other behaviors were observed to be relatively common. Some domains of LC, as illustrated by domain A in FIG. 14c, were bright in optical appearance prior to exposure to DMMP, a phenomenon that likely reflects interactions of the LC within these domains with the regions of the gel rich in the PS microparticles. These types of domains are seen as random bright spots in the low magnification images of the CLCG in FIG. 14(a) (t=0 s). Although these types of domains were not initially homeotropic, they did respond slowly to DMMP, as evidenced by the increase in brightness of domain A in FIG. 14c. The third type of LC-rich domain behavior is illustrated by domain B in FIG. 14c. The initial state of this domain is homeotropic, yet it exhibits a response to DMMP which is substantially faster than is typical for other LC-rich domains (domains C-E). This rapid response may be caused by the formation of frustrated states of the LC within the confines of the microparticle-rich network.

The results presented above demonstrate that the DMMP-induced ordering transitions of E7 are not prevented by incorporation of the PS microspheres within the CLCG. To determine if the network of PS microspheres in the CLCG hindered (or slowed) the ordering transition of the LC in the LC-rich domains, the responses of the CLCGs to E7 (not containing microspheres) that was deposited into microwells prepared with $Cu^{2+}$-functionalized surfaces were observed. The microwells were 2.8 μm deep, and had lateral sizes of 500 μm. When the E7-filled microwells were exposed to DMMP in the chamber described above, the E7 in the microwells underwent an ordering transition that occurred over approximately 80 s. These results lead to the conclusion that the incorporation of the LC within the CLC gel does not hinder the DMMP-induced ordering transition of the LC relative to the microwell geometry.

Experimental Section

Materials: 11-Mercaptoundecanoic acid (MUA), hydrated perchlorate salts of Cu(II), dimethyl methylphosphonate (DMMP) and tetradecane were purchased from Sigma Aldrich (Milwaukee, Wis.). The liquid crystal mixture E7 was purchased from EMD chemicals (Hawthorne, N.Y.). Titanium (99.999%) and gold (99.999%) were purchased from Advanced Materials (Spring Valley, N.Y.). Fisher's Finest Glass Slides were purchased from Fisher Scientific (Hamton, N.H.). Sulfate-coated polystyrene (PS) microspheres (#S37498) with diameters of 1 µm were obtained from Invitrogen (Carlbad, Calif.). All deionized water used in the study possessed a resistivity of 18.2 MΩ-cm.

Cleaning of glass substrates: Glass microscope slides were cleaned according to published procedures using 'piranha' solution [70:30 (% v/v) $H_2SO_4:H_2O_2$ (30%)], as described in detail elsewhere. (See, J. J. Skaife, N. L. Abbott, Chem. Mater. 1999, 11, 612.) Briefly, the glass slides were immersed in a piranha bath at 60-80° C. for at least 1 h, and then rinsed in running deionised water for 2-3 minutes. The slides were then immersed in basic piranha [70:30 (% v/v) KOH (45%): $H_2O_2$ (30%)] and heated to between 60 and 80° C. for at least 1 h. Finally, the slides were rinsed sequentially in deionised water, ethanol, and methanol, and then dried under a stream of nitrogen. The clean slides were stored in a vacuum oven at 110° C. All other glassware was cleaned prior to use.

Deposition of Gold Films: Semi-transparent films of gold with thicknesses of 200 Å were deposited onto piranha-cleaned glass slides mounted on rotating planetaries (no preferred direction or angle of incidence) within an electron beam evaporator (VEC-3000-C manufactured by Tek-vac Industries, Brentwood, N.Y.). The rotation of the substrates on the planetaries ensured that the gold was deposited without a preferred direction of incidence. A layer of titanium (thickness 80 Å) was used to promote adhesion between the glass microscope slides and the film of gold. The rates of deposition of gold and titanium were ~0.2 Å/sec. The pressure in the evaporator was maintained at less then $1 \times 10^{-6}$ torr before and during each deposition. The gold source was periodically cleaned by sequential immersion in aqua regia (70% $HNO_3$, 30% HCl) and piranha solutions at 50° C. (30 min in each solution). The cycle was repeated 3-4 times rinsing between cycles in deionised water.

Formation of Chemically Functionalized Surfaces: Carboxylic acid-terminated self-assembled monolayers (SAMs) of 11-mercaptoundecanoic acid (MUA) were formed on the gold-coated glass slides by immersing the slides overnight in an ethanolic solution containing 2 mM of MUA. The gold films were then rinsed with copious amounts of ethanol and dried under a stream of nitrogen. Metal ions ($Cu^{2+}$) were coordinated to the carboxylic acid-terminated SAMs by soaking the slides in 25 mM ethanolic solutions of Cu-perchlorates for 10 minutes and then rinsing them thoroughly in ethanol. Finally, excess salts were deposited onto the SAMs by spin-coating them with 4.5 mM Cu-perchlorate salt in ethanol at 3000 rpm for 60 s (WS-400A-6NPP/Lite, Lauren Technologies, North Wales, Pa.).

Colloid-in-Liquid-Crystal (CLC) gels: Polystyrene (PS) microspheres, 1 µm in diameter, were washed three times with DI water in Eppendorf tubes by centrifuging for 5 min at 9000 g, and suspended in fresh DI water by sonication and vortexing. The microspheres were dried in air for several days. Dried PS microspheres were weighed and suspended in isotropic E7 in an Eppendorf tube to obtain the desired wt % of PS microspheres in the mixture. The suspension was heated above the $T_{NI}$ of E7 in an oven or water bath, and vortexed and sonicated vigorously with extensive shaking and tumbling for several hours to ensure homogeneous dispersion of colloids. The suspension was then cooled at a fixed rate (–0.2° C./min) to room temperature in an oven, where it formed a CLCG. To prepare thin films of CLCGs, a small piece of CLCG prepared as described above was placed on a clean glass slide (plain or chemically functionalized), and heated above the TNT of E7 in an oven. As the composite formed a transparent suspension, another pre-warmed glass slide (plain or chemically functionalized) was placed on top of the suspension and spaced from the bottom slide using a 2 µm-thick Mylar spacer. The assembly was clamped with binder clips and cooled at a fixed rate (–0.2° C./min) to room temperature. In some experiments, after cooling, the top glass slide was removed using forceps.

Rheology: An Advanced Rheometric Expansion System (ARES) (TA Instruments, Rheometric Scientific, Piscataway, N.J.) with parallel-plate type geometry (test fixture; plate diameter 25 mm) was used to measure the mechanical properties of the CLCGs. Dynamic time, temperature, and frequency sweep tests were conducted in a shear strain-controlled mode. CLCGs were transferred to the rheometer plate at a temperature above the $T_{NI}$. A gap of 0.5-0.7 mm between the parallel plates was used such that CLC mixture filled the space between the plates, with excess material typically extending beyond the plates.

Confocal microscopy: Imaging was performed with a Nikon Diaphot 200 microscope equipped for standard wide-field fluorescent, brightfield and differential interference contrast (DIC) microscopy. Confocal images were collected using LaserSharp 5.2 software. Image analysis was accomplished by ImageJ software. A krypton/argon mixed-gas laser with excitation line 488 nm was used to excite fluorescent PS microspheres, detected using a band pass filter of 505-539 nm. A z-series of typically 25 images with a spatial resolution of 0.5 to 1 µm was collected.

Determination of Thickness: The thickness of the CLCG formed between the two glass microscope slides was measured using the following procedure. The thin film of the CLCG was dissolved into a known volume of ethanol and the UV absorbance of the solutions was measured with a Cary 1E UV-vis spectrophotometer (Varian Instruments, Sugar Land, Tex.). The absorbance spectra of 5 standard solutions of 5CB in ethanol were used to determine the mass of 5CB in the ethanol solution.

Exposure to DMMP: An Olympus IX-71 inverted microscope fitted with a Hamamatsu digital camera controlled by ImagePro software was used to capture optical images of the CLCG films. To monitor the optical response to DMMP, films of CLCG hosted on functionalized glass slides were placed on a glass chamber mounted on the microscope. Liquid DMMP (D169102, Sigma-Aldrich), with density 1.145 g/mL at 25° C., was diluted four times with tetradecane (>99%, 172456, Sigma Aldrich, by 252° C.) in an Eppendorf tube, and 0.2 µL of this diluted DMMP was placed on the filter paper in the glass chamber to generate a DMMP vapor within the chamber. The same exposure chamber was used to image the response of E7 to DMMP when hosted within microwells.

Example 7

CLCG in Aqueous Solutions

This example demonstrates that when thin films of CLCG supported on a glass slide are submerged in aqueous solutions, their cellular structure remains intact. In addition, no dewetting or destruction of the CLCG film structure or LC domains were observed when they were incubated in TBS buffer (pH 7.4) for up to one week. The CLCGs of this example were fabricated according to the methods described in Example 4, above.

Figure 15:
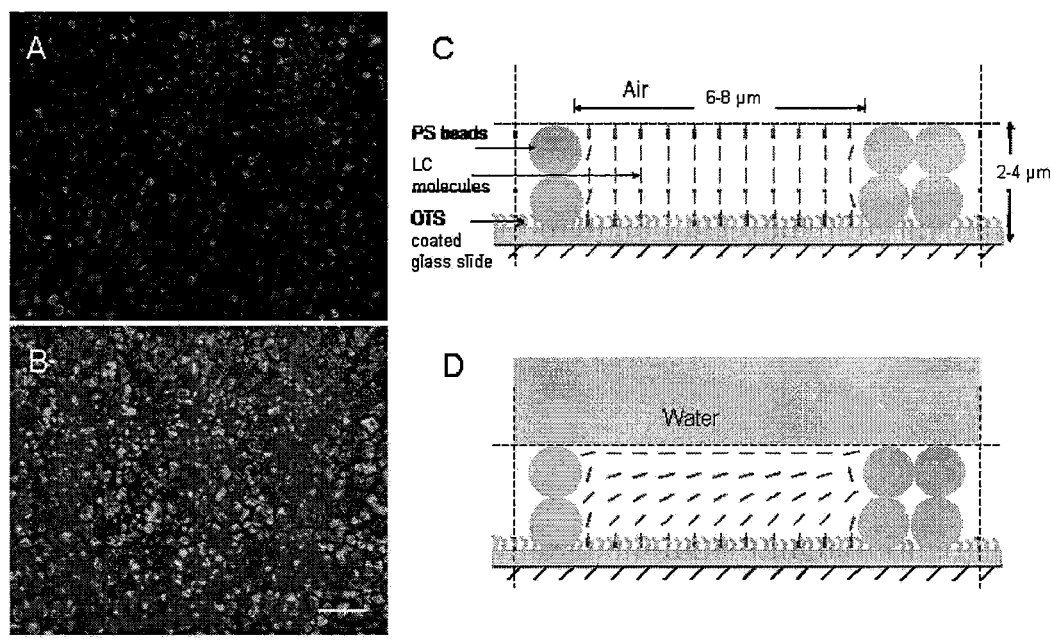
FIG. 15 shows thin films of CLCGs prepared on OTS-functionalized glass slides change their optical appearance from dark to birefringent on immersion in water, when observed between crossed-polars: (a,b) Micrographs of a CLCG film on an OTS-functionalized glass with the other LC interface exposed to (a) air, or (b) water, observed between crossed polars; (c,d) Sketch of the orientation of LC in a LC-rich domain of CLCG film exposed to (c) air, or (d) water. Scale-bar—30 µm.

Furthermore, when CLCG films hosted on an OTS-treated glass slide were immersed in TBS buffer, the optical appearance of the CLCG film between crossed polars changed from completely dark in air to colorfully birefringent in water as shown in FIGS. 15a and b, for films of CLCGs formed from the suspensions of 10 wt % PS microspheres in liquid crystal E7. This optical response is explained schematically in FIGS. 15c and 15d which show the calamitic thermotropic E7 liquid crystals in a homeotropic orientation at their free surface in air (air-LC interface) (FIG. 15a) and planar orientation at their free interface in water (water-LC interface) (FIG. 15b). Thus, as the CLCG film is immersed in water, the change in the confining interface of LC domains from air to water results in a change in the anchoring of LC at that interface from homeotropic (perpendicular to the interface) to planar (parallel to the interface). This change in surface anchoring of the LC in the LC domains results in an ordering transition of the LC across the thickness of the domains in the film, changing the retardance of the light through the LC domains and thus, the optical appearance of the LC domains from dark to birefringent.

Example 8

CLCG-Based Lipid Detector

Figure 16:
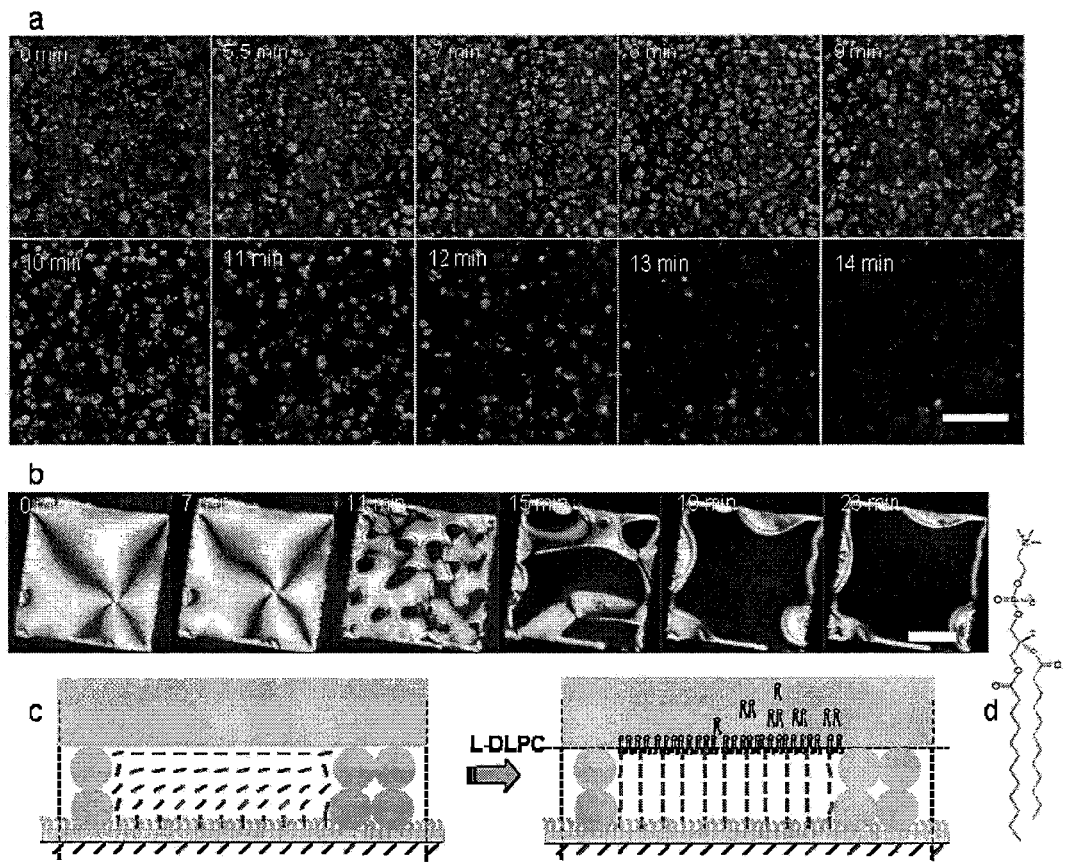
FIG. 16 shows the change in the orientational ordering of LC of LC domains, and hence their birefringence, in response to the adsorption of L-DLPC at the aqueous/LC interface: (a) Optical micrographs (between crossed-polars) of a CLCG film on OTS-functionalized glass at successive time points after incubating with 10 µM L-DLPC solution; scale bar—50 µm; (b) Optical micrographs of E7 housed in a specimen-grid at successive time points after incubating with 10 µM L-DLPC solution; scale bar—100 µm; (c) Sketch of the orientational order of LC in LC-rich domains of CLCG before and after adsorption of lipid on aqueous/LC interface. (d)
Figure 16:
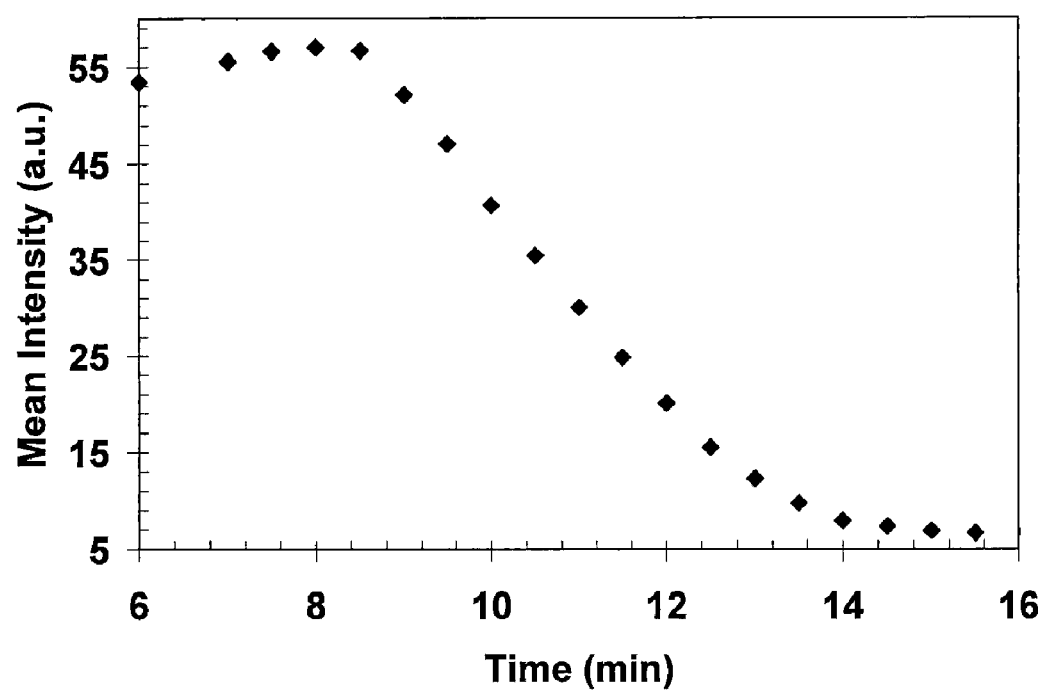

The CLCG of Example 7 can be used for the assembly and hence detection of lipids. FIG. 16a shows that when the CLCG of Example 7 was incubated with a 10 µM solution of L-Dilauroylphosphatidylcholine (L-DLPC) in TBS buffer (pH 7.4), a change in the birefringence of the LC domains between crossed-polars was observed with time, until they became completely dark in less than 15 min. A graph of the decrease in mean light intensity is shown in FIG. 16(f).

A schematic of a LC domain in the CLCG film, shown in FIG. 16c, explains the behavior shown in FIG. 16a. As L-DLPC assembles on the LC/water interface of the LC domains, with its hydrophobic tails and hydrophilic head groups partitioned between LC and water respectively, the ordering of LC at the LC/water interface changes from planar to homeotropic. This change in the surface anchoring of LC triggers a change in the orientation of LC all across the thickness of the LC domain, changing the retardance of light passing through the domain, and timely changing their optical appearance from bright to dark.

In an alternative embodiment of lipid-based detection, incubation of a microgram per milliliter concentration of an aqueous solution of lipopolysacharride (endotoxin) with a CLCG can also produce a change in the optical appearance of the CLCG.

Example 9

Detection of the Activity of Lipid Degrading Enzymes Using Thin Film CLCGs

Phospholipase $A_2$ (PLA$_2$) stereoselectively catalyzes the hydrolysis of L-DLPC to form a 1-lysophospholipid and a fatty acid through a Ca$^+$-regulated pathway. See, I de Haas G H, Bonsen P P M, Peterson W A, van Deenen L L M, Studies on phospholipase A and its zymogen from porcine pancreas. 3. Action of the enzyme on short-chain lecithins. *Biochim. Biophys. Acta* 239, 252 (1971); and Zografi G, Verger R, de Haas G H. Kinetic analysis of the hydrolysis of lecithin monolayers by phospholipase A. *Chemistry and Physics of Lipids* 1971; 7(4):185-206. When a thin film of CLCG formed on a OTS-treated glass slide and decorated with L-DLPC on the water/LC interface of LC domains was incubated with 10 nM PLA$_2$ enzyme (in TBS buffer, pH 7.4, containing 6.2 mM Ca$^{++}$), the LC domains transformed from dark to colorfully birefringent over 60 min (FIG. 17a). The degradation of L-DLPC by PLA$_2$ resulted in the desorbtion of the L-DLPC from the lipid-laden water/LC interface, triggering a change in the surface anchoring of LC from homeotropic to planar, as sketched for a LC domain in FIG. 17b. These observations are similar to those observed using E7 housed in a gold grids on OTS-treated glass slide, as shown in FIG. 17c. However, as shown by the comparison of FIG. 17 a and c, the complete re-organization of optical texture of lipid-laden LC/water interface on incubation with PLA$_2$ takes more than several hours on a gold grid (283 µm square) compared to LC domains (5-10 µm diameter). Thus, the small size of LC domains in the CLCG film, along with colloidal boundaries, may facilitate easy harbouring, and thus interaction, of PLA$_2$ with the lipid on LC/water interface. In the absences of Ca$^{2+}$, PLA$_2$ did not cause a change in the orientation of LC in LC domains of CLCG films.

Example 10

Patterning CLCGs

Materials and Methods:

This example describes surface patterning of a CLCG composed of 10 wt % PS microspheres in an E7 LC.

First, 80 Å of titanium and 200 Å of gold were deposited sequentially (at a rate of 0.2 Å/s) onto piranha cleaned glass slides (Fisher's Finest) by using an electron-beam evaporator (Tek-vac Industries, Brentwood, N.Y.). An elastomeric stamp was produced by casting poly(dimethylsiloxane) (PDMS) on an appropriate master using photolithography. Pattern features of approximately ~10 µm width were prepared using this technique. Next, the elastomeric stamp of PDMS was inked with an ethanolic solution (2 mM) of hexadecanethiol (HDT) and placed in contact with the surface of the polycrystalline film of gold for ~30 s. Hexadecanethiol transfers from the protruding regions of the stamp to the surface and forms a SAM in the region of contact. Because the recessed features of the stamp do not touch the surface of the gold, and because the system of neat HDT and the SAM formed from it is autophobic, the regions of the gold that were not contacted by the stamp were not derivatized by the HDT.

After removal of the stamp, the gold surface was contacted with a dilute ethanolic solution containing a second thiol (Cysteamine hydrochloride, 1 mM) for 18 hours. This second thiol precursor selectively derivatized the bare regions of gold. This process of microcontact printing using the elastomeric stamp and corresponding circuit pattern furnished two different energy surfaces (alkane thiol and amine thiol) on the gold surface.

Patterned CLCG Formation: Thin films of CLCG were prepared on patterned surfaces as follows. A small piece of CLCG (10% PS in E7), of the type described in Example 6, was placed onto the patterned gold coated glass slide (first surface) and heated above $T_{NI}$. As the composite formed a transparent suspension, it was covered with a prewarmed plain piranha cleaned glass slide (second surface) using spacers of desired thickness (2 µm). The assembly was clamped with binder clips and cooled down at a fixed rate (0.2° C./min) to room temperature. Finally, the second surface was carefully removed so that the single domains of CLCG did not extend from the first surface to the second one.

The thin film CLCG formed domains of different sizes on the different regions of the patterned substrate. For example, the domain sizes were larger (~12-15 µm) on the HDT regions of the surface (low energy) in comparison (5-8 µm) to the high energy regions (amine thiol). As shown in FIG. 18 a pattern of domains has been formed in the CLCG in contact with patterned SAMs.

REFERENCES

[1] B. Jerome, Reports on Progress in Physics 1991, 54, 391.
[2] V. K. Gupta, J. J. Skaife, T. B. Dubrovsky, N. L. Abbott, Science 1998, 279, 2077.
[3] J. M. Brake, M. K. Daschner, Y.-Y. Luk, N. L. Abbott, Science 2003, 302, 2094.
[4] N. A. Lockwood, J. C. Mohr, L. Ji, C. J. Murphy, S. P. Palecek, J. J. de Pablo, N. L. Abbott, Advanced Functional Materials 2006, 16, 618.
[5] P. C. Georges, P. A. Janmey, J Appl Physiol 2005, 98, 1547.
[6] D. E. Discher, P. Janmey, Y.-l. Wang, Science 2005, 310, 1139.
[7] T. Yeung, P. C. Georges, L. A. Flanagan, B. Marg, M. Ortiz, M. Funaki, N. Zahir, W. Ming, V. Weaver, P. A. Janmey, Cell Motility and the Cytoskeleton 2005, 60, 24.
[8] J. Solon, I. Levental, K. Sengupta, P. C. Georges, P. A. Janmey, Biophys. J. 2007, 93, 4453.
[9] S. P. Meeker, W. C. K. Poon, J. Crain, E. M. Terentjev, Phys. Rev. E J1-PRE 2000, 61, R6083LP
[10] P. G. Petrov, E. M. Terentjev, Langmuir 2001, 17, 2942.
[11] D. Vollmer, G. Hinze, B. Ullrich, W. C. K. Poon, M. E. Cates, A. B. Schofield, Langmuir 2005, 21, 4921.
[12] L. A. TerceroEspinoza, K. R. Schumann, Y. Y. Luk, B. A. Israel, N. L. Abbott, Langmuir 2004, 20, 2375.
[13] S. R. Kim, N. L. Abbott, Langmuir 2002, 18, 5269.
[14] J. Fang, W. Ma, J. V. Selinger, R. Shashidhar, Langmuir 2003, 19, 2865.
[15] Y.-Y. Luk, S. F. Campbell, N. L. Abbott, C. J. Murphy, Liquid Crystals 2004, 31, 611
[16] J. Cognard, Molecular Crystals and Liquid Crystals 1982, Suppl. 1, 1.
[17] H. Stark, Physics Reports 2001, 351, 387.
[18] J. L. West, A. Glushchenko, G. Liao, Y. Reznikov, D. Andrienko, M. P. Allen, Phys. Rev. E J1-PRE 2002, 66, 012702.
[19] Y. C. Jean, R. Zhang, H. Cao, J.-P. Yuan, C.-M. Huang, B. Nielsen, P. Asoka-Kumar, Physical Review B 1997, 56, R8459.
[20] V. J. Anderson, E. M. Terentjev, S. P. Meeker, J. Crain, W. C. K. Poon, The European Physical Journal E 2001, 4, 11.
[21] R. J. Pelham, Jr, Y.-I. Wang, Proceedings of the National Academy of Sciences 1997, 94, 13661.
[22] H.-B. Wang, M. Dembo, Y.-L. Wang, Am J Physiol Cell Physiol 2000, 279, C1345.
[23] Q. L. Yu, J. B. Zhou, Y. C. Fung, American Journal of Physiology-Heart and Circulatory Physiology 1993, 265, H52.
[24] R. Q. Erkamp, P. Wiggins, A. R. Skovoroda, S. Y. Emelianov, M. O'Donnell, Ultrasonic Imaging 1998, 20, 17.
[25] J. Cleaver, W. C. K. Poon, Journal of Physics: Condensed Matter 2004, 16 S1901.
[26] J. M. Brake, A. D. Mezera, N. L. Abbott, Langmuir 2003, 19, 6436.
[27] Jr. M. Brake, N. L. Abbott, Langmuir 2002, 16, 6101.
[28] J. J. Skaife, N. L. Abbott, Chem. Mater. 1999, 11, 612.

For the purposes of this disclosure, and unless otherwise specified, "a" or "an" means "one or more." All patents, applications, references, and publications cited herein are incorporated by reference in their entirety to the same extent as if they were individually incorporated by reference.

It is understood that the invention is not confined to the particular embodiments set forth herein as illustrative, but embraces all such forms thereof as come within the scope of the following claims.

What is claimed is:

1. A colloidal liquid crystal gel comprising:
   a plurality of particles; and
   a liquid crystal;
   wherein the plurality of particles are in the form of a network of particles and the liquid crystal comprises a plurality of liquid crystal domains dispersed in the network of particles, the liquid crystal domains being surrounded and separated by domain boundaries formed by the particles in the network of particles;
   wherein the gel is in the form of a layer having a first surface and a second surface disposed opposite the first surface, and further wherein at least some of the liquid crystal domains extend through the layer from the first surface to the second surface.

2. The gel of claim 1, wherein the particles comprise polystyrene.

3. The gel of claim 1, wherein the gel has a storage modulus of at least about 1 kPa at 37° C.

4. The gel of claim 1, wherein the layer has a thickness of no greater than about 200 µm.

5. The gel of claim 1, wherein the gel is in the form of a layer disposed on a mesogen-aligning surface of a substrate.

6. The gel of claim 5, wherein the mesogen-aligning surface of the substrate is a chemically patterned surface which produces a pattern in the liquid crystal domains.

7. The gel of claim 1, further comprising one or more recognition moieties associated with the gel and configured to interact with an analyte, thereby causing a detectable change in one or more of the liquid crystal domains.

8. The gel of claim 7, wherein the recognition moieties are selected from the group consisting of peptides, oligonucleotides, oligopeptides, metal salts, lipids, phospholipids, glycolipids, proteins, and carbohydrates.

9. The gel of claim 5, wherein the mesogen-aligning surface comprises a metal salt-functionalized surface.

10. The gel of claim 1, wherein the particles are free of solvent-based impurities.

11. A cell culture substrate comprising:
   (a) colloidal liquid crystal gel comprising:
      a plurality of particles; and
      a liquid crystal;
      wherein the plurality of particles are in the form of a network of particles and the liquid crystal comprises a plurality of liquid crystal domains dispersed in the network of particles, the liquid crystal domains being surrounded and separated by domain boundaries formed by the particles in the network of particles; and
   (b) a film comprising a protein or a peptide disposed over the colloidal liquid crystal gel.

12. A colloidal liquid crystal gel comprising:
   (a) a plurality of particles; and
   (b) a liquid crystal;
   wherein the plurality of particles are in the form of a network of particles and the liquid crystal comprises a plurality of liquid crystal domains dispersed in the network of particles, the liquid crystal domains being surrounded and separated by domain boundaries formed by the particles in the network of particles; the colloidal liquid crystal gel having a first surface in contact with an aqueous solution to provide a liquid crystal-aqueous interface and a second surface disposed opposite the first surface and in contact with a solid substrate to provide a liquid crystal-solid interface; and (c) a plurality of recognition moieties associated with the liquid crystal-aqueous interface and a plurality of recognition moieties associated with the liquid crystal-solid interface.

13. The gel of claim 1, wherein the particles are spherical particles and the average diameter of the particles in the plurality of particles is no greater than about 5 μm.

14. The gel of claim 13, wherein the particles are selected from the group consisting of polystyrene particles, polymethylmethacrylate particles, clay particles, silica particles and cellulose particles.

* * * * *